US012395046B2

(12) United States Patent
Pomeroy et al.

(10) Patent No.: US 12,395,046 B2
(45) Date of Patent: Aug. 19, 2025

(54) FIRMWARE CONTROL PROVIDING A SOFT STOP ON COMPRESSION DRIVE NAILER

(71) Applicant: TECHTRONIC CORDLESS GP, Anderson, SC (US)

(72) Inventors: Edward A. Pomeroy, Peidmont, SC (US); Elton L. Watson, Greenville, SC (US); Justin Clack, Oak Grove, LA (US); Henry T. Johnson, Seneca, SC (US)

(73) Assignee: Techtronic Cordless GP, Anderson, SC (US)

( * ) Notice: Subject to any disclaimer, the term of this patent is extended or adjusted under 35 U.S.C. 154(b) by 218 days.

(21) Appl. No.: 18/354,799

(22) Filed: Jul. 19, 2023

(65) Prior Publication Data

US 2024/0030784 A1    Jan. 25, 2024

Related U.S. Application Data

(60) Provisional application No. 63/391,620, filed on Jul. 22, 2022.

(51) Int. Cl.
*H02K 11/215*    (2016.01)
*B25C 1/04*    (2006.01)
(Continued)

(52) U.S. Cl.
CPC ............ *H02K 11/215* (2016.01); *B25C 1/041* (2013.01); *H02K 7/145* (2013.01); *H02P 27/08* (2013.01)

(58) Field of Classification Search
CPC ........... B25C 1/06; B25C 1/008; B25C 1/047; B25C 1/04; B25C 1/00; B25C 1/041;
(Continued)

(56) References Cited

U.S. PATENT DOCUMENTS 942,163 A    12/1909 Bernet
3,150,488 A    9/1964 Haley
(Continued)

FOREIGN PATENT DOCUMENTS

CN    102477973 A    5/2012
CN    106788125 A    5/2017
(Continued)

OTHER PUBLICATIONS

Extended European Search Report for Application No. 23186864.7 dated Dec. 15, 2023 (6 pages).

*Primary Examiner* — Antony M Paul
(74) *Attorney, Agent, or Firm* — Michael Best & Freidrich LLP

(57) ABSTRACT

A method for controlling a motor of a power tool including performing a load test on a battery pack of the power tool, determining, via a first controller, a first mechanism control scheme based on the load test, receiving, via the first controller, a user input indicative of beginning an operation cycle of the power tool, and isolating the first controller from a second controller. The method further including controlling, via the first controller, the motor based on the first mechanism control scheme, sensing a dataset indicative of a result of the operation cycle based on the first mechanism control scheme, receiving, via the second controller, the dataset, connecting the first controller to the second controller upon completion of the operation cycle, transmitting, via the second controller, the dataset to the first controller, and determining, via the first controller, a second mechanism control scheme based on the dataset.

36 Claims, 14 Drawing Sheets

(51) Int. Cl.
  *H02K 7/14* (2006.01)
  *H02P 27/08* (2006.01)
(58) Field of Classification Search
  CPC ... B25F 5/00; H02K 7/145; H02P 3/08; H02P 27/08; F15B 2211/8855; F15B 15/149; F15B 9/09
  See application file for complete search history.

(56) References Cited

U.S. PATENT DOCUMENTS

| | | |
|---|---|---|
| 3,288,339 A | 11/1966 | Bade |
| 3,567,098 A | 3/1971 | Maynard |
| 4,192,389 A | 3/1980 | Raman |
| 4,913,331 A | 4/1990 | Utsumi et al. |
| 6,604,666 B1 | 8/2003 | Pedicini et al. |
| 6,705,503 B1 | 3/2004 | Pedicini et al. |
| 6,739,490 B1 | 5/2004 | Shkolnikov et al. |
| 6,766,935 B2 | 7/2004 | Pedicini et al. |
| 6,769,593 B2 | 8/2004 | Pedicini et al. |
| 6,796,476 B2 | 9/2004 | Birk et al. |
| 7,225,959 B2 | 6/2007 | Patton et al. |
| 7,275,505 B2 | 10/2007 | Moeller et al. |
| 7,325,711 B2 | 2/2008 | Schiestl et al. |
| 7,494,035 B2 | 2/2009 | Weaver et al. |
| 7,594,599 B2 | 9/2009 | Webb |
| 7,793,811 B1 | 9/2010 | Pedicini et al. |
| 7,980,440 B2 | 7/2011 | Hahn et al. |
| 8,011,441 B2 | 9/2011 | Leimbach et al. |
| 8,011,547 B2 | 9/2011 | Leimbach et al. |
| 8,079,504 B1 | 12/2011 | Pedicini et al. |
| 8,091,751 B2 | 1/2012 | Tanaka |
| 8,230,941 B2 | 7/2012 | Leimbach et al. |
| 8,267,296 B2 | 9/2012 | Leimbach et al. |
| 8,267,297 B2 | 9/2012 | Leimbach et al. |
| 8,286,722 B2 | 10/2012 | Leimbach et al. |
| RE44,001 E | 2/2013 | Pedicini et al. |
| 8,387,718 B2 | 3/2013 | Leimbach et al. |
| 8,523,035 B2 | 9/2013 | Pedicini et al. |
| 8,550,321 B2 | 10/2013 | Webb |
| 8,561,869 B2 | 10/2013 | Towfighi |
| 8,602,282 B2 | 12/2013 | Leimbach et al. |
| 8,733,610 B2 | 5/2014 | Pedicini |
| 8,763,874 B2 | 7/2014 | McCardle et al. |
| 8,800,834 B2 | 8/2014 | Pedicini et al. |
| 8,857,692 B2 | 10/2014 | Shima et al. |
| 8,875,969 B2 | 11/2014 | Pedicini et al. |
| 8,939,341 B2 | 1/2015 | Pedicini et al. |
| 8,963,458 B2 | 2/2015 | Muto et al. |
| 9,050,712 B2 | 6/2015 | Campbell |
| 9,555,530 B2 | 1/2017 | Pedicini et al. |
| 9,662,777 B2 | 5/2017 | Pomeroy et al. |
| 9,676,088 B2 | 6/2017 | Leimbach et al. |
| 9,782,882 B2 | 10/2017 | Wolf et al. |
| 9,827,659 B2 | 11/2017 | Matsuno |
| 9,844,865 B2 | 12/2017 | Furuta et al. |
| 9,943,952 B2 | 4/2018 | Kato |
| 9,969,070 B2 | 5/2018 | Campbell |
| 10,058,985 B2 | 8/2018 | Raggi et al. |
| 10,076,830 B2 | 9/2018 | Raggl et al. |
| 10,131,047 B2 | 11/2018 | Yanagihara et al. |
| 10,201,892 B2 | 2/2019 | Bruggmueller et al. |
| 10,259,110 B2 | 4/2019 | Bruggmueller et al. |
| 10,272,550 B2 | 4/2019 | Dey, IV et al. |
| 10,272,553 B2 | 4/2019 | Yang et al. |
| 10,286,534 B2 | 5/2019 | Kato |
| 10,343,271 B2 | 7/2019 | Campbell |
| 10,427,284 B2 | 10/2019 | Kato |
| 10,471,579 B2 | 11/2019 | Zhang |
| 10,478,954 B2 | 11/2019 | Leimbach et al. |
| 10,525,577 B2 | 1/2020 | Masatoshi et al. |
| 10,583,545 B2 | 3/2020 | Dey, IV et al. |
| 10,654,154 B2 | 5/2020 | Schnell et al. |
| 10,759,029 B2 | 9/2020 | Schnell et al. |
| 10,759,032 B2 | 9/2020 | Schmidt et al. |
| 10,786,891 B2 | 9/2020 | Noguchi et al. |
| 10,821,586 B2 | 11/2020 | Wu et al. |
| 11,034,007 B2 | 6/2021 | Leimbach et al. |
| 11,241,776 B2 | 2/2022 | Leimbach et al. |
| 2004/0134961 A1 | 7/2004 | Wolf et al. |
| 2004/0232194 A1 | 11/2004 | Pedicini et al. |
| 2006/0180631 A1 | 8/2006 | Pedicini et al. |
| 2008/0217372 A1 | 9/2008 | Webb |
| 2011/0180581 A1 | 7/2011 | Liang et al. |
| 2013/0336809 A1 | 12/2013 | Antoun et al. |
| 2014/0001224 A1 | 1/2014 | Mcneill et al. |
| 2014/0263535 A1 | 9/2014 | Rajani et al. |
| 2014/0299646 A1 | 10/2014 | Webb |
| 2015/0298308 A1* | 10/2015 | Kato .................. B25C 1/06 318/484 |
| 2016/0144497 A1 | 5/2016 | Boehm et al. |
| 2017/0361442 A1 | 12/2017 | Fairbanks et al. |
| 2017/0361443 A1 | 12/2017 | Sareault et al. |
| 2018/0009097 A1 | 1/2018 | Cheatham et al. |
| 2018/0207777 A1 | 7/2018 | Cheatham et al. |
| 2018/0243891 A1 | 8/2018 | Dittrich et al. |
| 2018/0370003 A1 | 12/2018 | Schmidt |
| 2018/0370006 A1 | 12/2018 | Dittrich et al. |
| 2019/0143498 A1 | 5/2019 | Weber et al. |
| 2019/0283225 A1 | 9/2019 | Zhao et al. |
| 2020/0061786 A1 | 2/2020 | Zhang |
| 2020/0106380 A1 | 4/2020 | Sheeks et al. |
| 2020/0164498 A1 | 5/2020 | Wechselberger et al. |
| 2020/0171632 A1 | 6/2020 | Dey, IV et al. |
| 2020/0189081 A1 | 6/2020 | Yang et al. |
| 2020/0238494 A1 | 7/2020 | Li et al. |
| 2021/0021215 A1 | 1/2021 | Tsai et al. |
| 2021/0354277 A1 | 11/2021 | Morimura |

FOREIGN PATENT DOCUMENTS

| | | |
|---|---|---|
| CN | 206263884 U | 6/2017 |
| CN | 206353253 U | 7/2017 |
| CN | 107914242 A | 4/2018 |
| CN | 207629980 U | 7/2018 |
| CN | 108527255 A | 9/2018 |
| CN | 109623736 A | 4/2019 |
| CN | 209648625 U | 11/2019 |
| CN | 110900524 A | 3/2020 |
| CN | 210550947 U | 5/2020 |
| CN | 112677109 A | 4/2021 |
| CN | 112828827 A | 5/2021 |
| DE | 1503164 A1 | 3/1970 |
| DE | 3728454 A1 | 3/1989 |
| FR | 1414089 A | 10/1965 |
| GB | 1044288 A | 9/1966 |
| WO | 2011010511 A1 | 1/2011 |
| WO | 2011010512 A1 | 1/2011 |
| WO | 2011010634 A1 | 1/2011 |
| WO | 2013161909 A1 | 10/2013 |
| WO | 2013168719 A1 | 11/2013 |
| WO | 2014061807 A1 | 4/2014 |
| WO | 2014073669 A1 | 5/2014 |
| WO | 2014084221 A1 | 6/2014 |
| WO | 2014084222 A1 | 6/2014 |
| WO | 2014087934 A1 | 6/2014 |

* cited by examiner

FIRMWARE CONTROL PROVIDING A SOFT STOP ON COMPRESSION DRIVE NAILER

RELATED APPLICATIONS

This application claims priority to U.S. Provisional Patent Application No. 63/391,620, filed on Jul. 22, 2022, the entire content of which is hereby incorporated by reference.

FIELD OF THE DISCLOSURE

The present disclosure relates to power tools, and more particularly to powered fastener drivers.

SUMMARY OF THE DISCLOSURE

Fastener drivers, or powered fastener drivers, may be used to drive fasteners (e.g., nails, tacks, staples, etc.) into a workpiece. Fastener drivers may operate utilizing various energy sources (e.g., compressed air generated by an air compressor, electrical energy, flywheel mechanisms, etc.), but often these designs are met with power, size, and cost constraints.

The disclosure provides, in one aspect, a method for controlling a motor of a power tool. The method may include performing, via a first controller, a load test on a battery pack of the power tool, determining, via the first controller, a first mechanism control scheme based on the load test, receiving, via the first controller, a user input indicative of beginning an operation cycle of the power tool, and isolating the first controller from a second controller. The method further includes controlling, via the first controller, the motor of the power tool based on the first mechanism control scheme while the first controller is isolated from the second controller, sensing, via one or more sensors, a dataset indicative of a result of the operation cycle of the power tool based on the first mechanism control scheme, receiving, via the second controller, the dataset, connecting the first controller to the second controller upon completion of the operation cycle, transmitting, via the second controller, the dataset to the first controller upon completion of the operation cycle, and determining, via the first controller, a second mechanism control scheme based on the dataset.

In another aspect, the method for controlling a motor of a power tool may include electrically braking the motor, via a command from a first controller, based on a first mechanism control scheme and detecting, via a first controller, a completion of an operation cycle of the motor. The method may further include transmitting, via a second controller, a dataset indicative of a position of a first piston of the power tool to the first controller upon completion of the operation cycle, and determining, via the first controller, a second mechanism control scheme based on the dataset, wherein the first controller is isolated from the second controller during the operation cycle.

The disclosure provides, in another aspect, a powered fastener driver including a first cylinder, a first piston positioned within the first cylinder, the first piston being moveable between a top-dead-center (TDC) position and a bottom-dead-center (BDC) position, a second cylinder in fluid communication with the first cylinder, a second piston positioned within the second cylinder, the second piston being moveable between a top-dead-center (TDC) position and a near bottom-dead-center (BDC) position to initiate a fastener driving cycle, and a control system. The control system may electrically brake the motor, via a command from a first controller, based on a first mechanism control scheme, drive the motor, via a command from the first controller, based on the first mechanism control scheme, detect, via the first controller, a completion of an operation cycle of the motor, transmit, via a second controller, a dataset indicative of a position of a first piston of the power tool to the first controller upon completion of the operation cycle, and determine, via the first controller, a second mechanism control scheme based on the dataset, wherein the first controller is isolated from the second controller during the operation cycle.

Other aspects of the disclosure will become apparent by consideration of the detailed description and accompanying drawings.

Before any embodiments of the disclosure are explained in detail, it is to be understood that the present subject matter is not limited in its application to the details of construction and the arrangement of components set forth in the following description or illustrated in the following drawings. The present subject matter is capable of other embodiments and of being practiced or of being carried out in various ways.

DETAILED DESCRIPTION

Unless the context of their usage unambiguously indicates otherwise, the articles "a," "an," and "the" should not be interpreted as meaning "one" or "only one." Rather these articles should be interpreted as meaning "at least one" or "one or more." Likewise, when the terms "the" or "said" are used to refer to a noun previously introduced by the indefinite article "a" or "an," "the" and "said" mean "at least one" or "one or more" unless the usage unambiguously indicates otherwise.

It should also be understood that although certain drawings illustrate hardware and software located within particular devices, these depictions are for illustrative purposes only. In some embodiments, the illustrated components may be combined or divided into separate software, firmware and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links.

Thus, in the claims, if an apparatus or system is claimed, for example, as including an electronic processor or other element configured in a certain manner, for example, to make multiple determinations, the claim or claim element should be interpreted as meaning one or more electronic processors (or other element) where any one of the one or more electronic processors (or other element) is configured as claimed, for example, to make some or all of the multiple determinations. To reiterate, those electronic processors and processing may be distributed.

Figure 1:
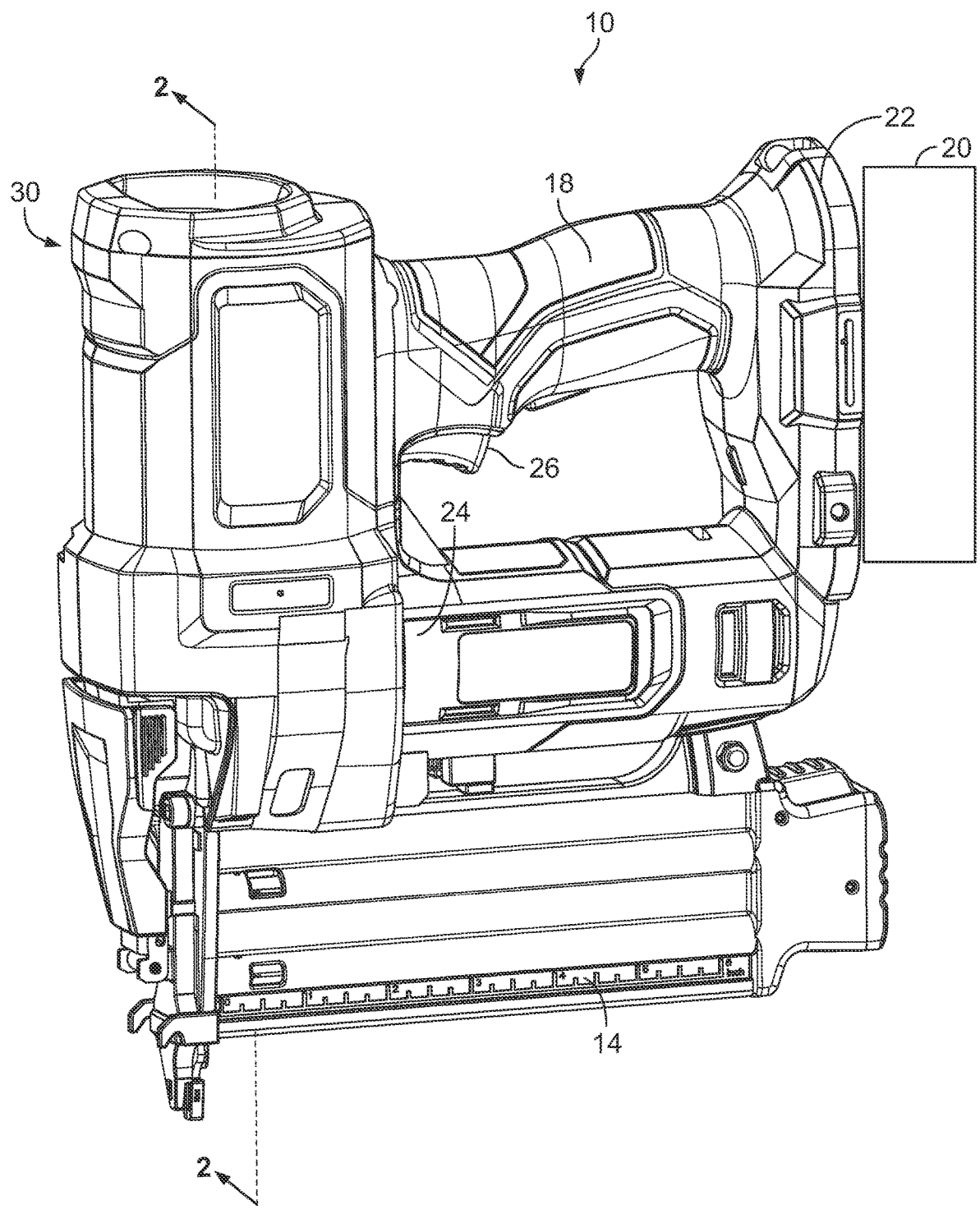
FIG. 1 is a perspective view of a powered fastener driver in accordance with an embodiment of the disclosure.

With reference to FIG. 1, a powered fastener driver 10 is operable to drive fasteners (e.g., nails, tacks, staples, and/or the like) held within a magazine 14 into a workpiece. The powered fastener driver 10 includes an outer housing with a handle portion 18, a structural housing 24, and a user-actuated trigger 26 mounted on the handle portion 18. Notably, the powered fastener driver 10 does not require an external source of air pressure, but rather the powered fastener driver 10 includes an on-board air compressor 30. In this way, the weight and/or size of tool may be reduced. The on-board air compressor 30 is powered by a power source (e.g., a battery pack 20), coupled to a battery attachment portion 22 of the outer housing.

Figure 2:
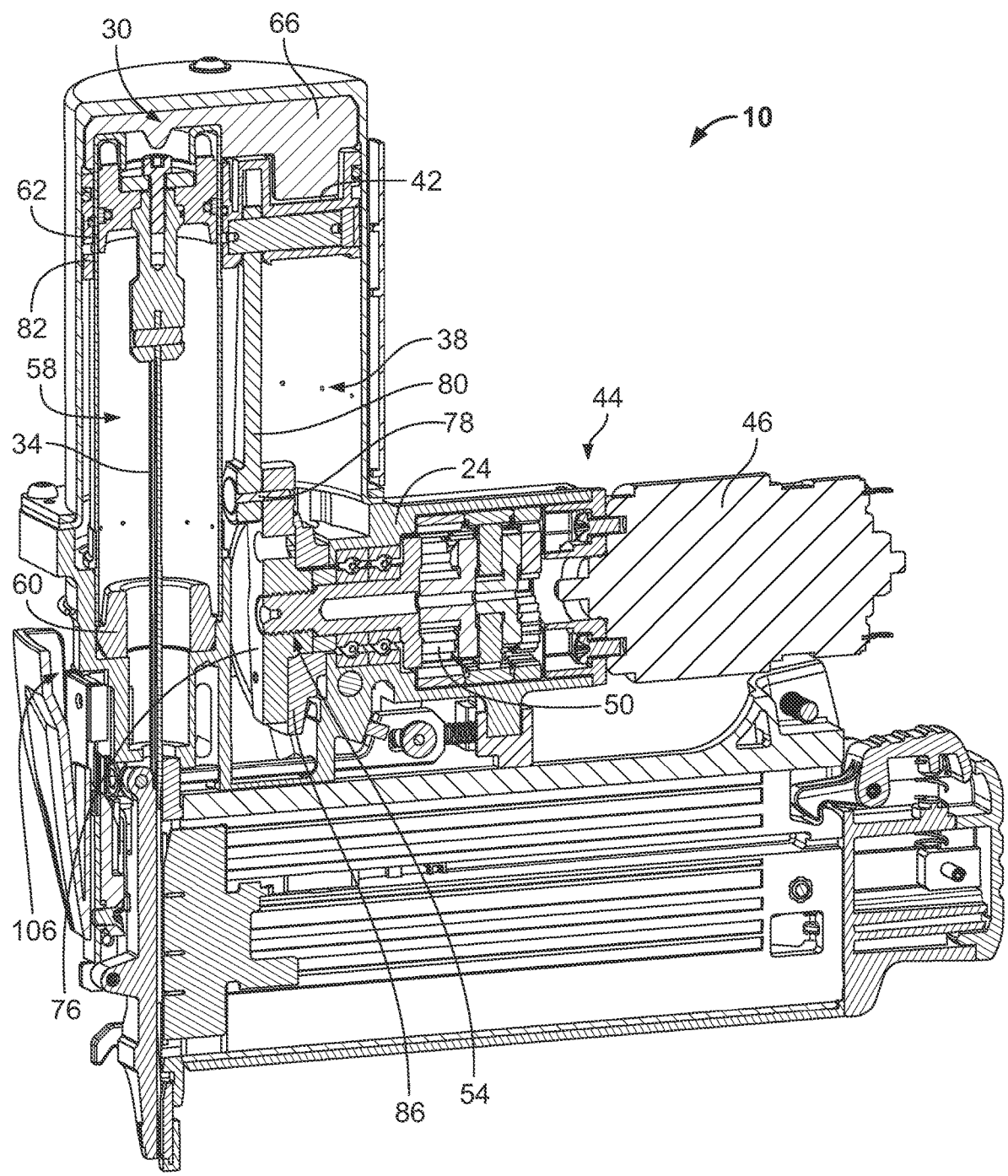
FIG. 2 is a cross-sectional view of a portion of the powered fastener driver of FIG. 1 taken along line 2-2 in FIG. 1, illustrating an onboard compressor, in accordance with an embodiment of the disclosure.

With reference to FIG. 2, the powered fastener driver 10 includes a drive blade 34 actuated by the on-board air compressor 30 to drive the fasteners into a workpiece. The compressor 30 includes a compression cylinder 38, a compressor piston 42 disposed in the compression cylinder 38, and a drive mechanism 44 that imparts reciprocating motion to the compressor piston 42 to execute one or more consecutive fastener driving cycles. The drive mechanism 44 includes a motor 46 (e.g., a brushed or brushless DC motor), a transmission 50 (e.g., a multi-stage planetary transmission, and/or the like), and a crank arm assembly 54 that is configured to convert a rotational output of the transmission 50 to a reciprocating input to the compressor piston 42. The fastener driver 10 may additionally include a drive cylinder 58 and a drive piston 62 slidably disposed in the drive cylinder 58. The drive piston 62 is movable between a top-dead-center (TDC) position and a bottom-dead-center (BDC) position. Similarly, the compressor piston 42 is moveable between a TDC position and a position that is near or close to a BDC position. For example, In the illustrated embodiment, the driver cylinder 58 may additionally include a stop member 60 (e.g., a resilient bumper) positioned to engage and absorb energy from the drive piston 62 when the drive piston 62 reaches the BDC position.

Figure 3:
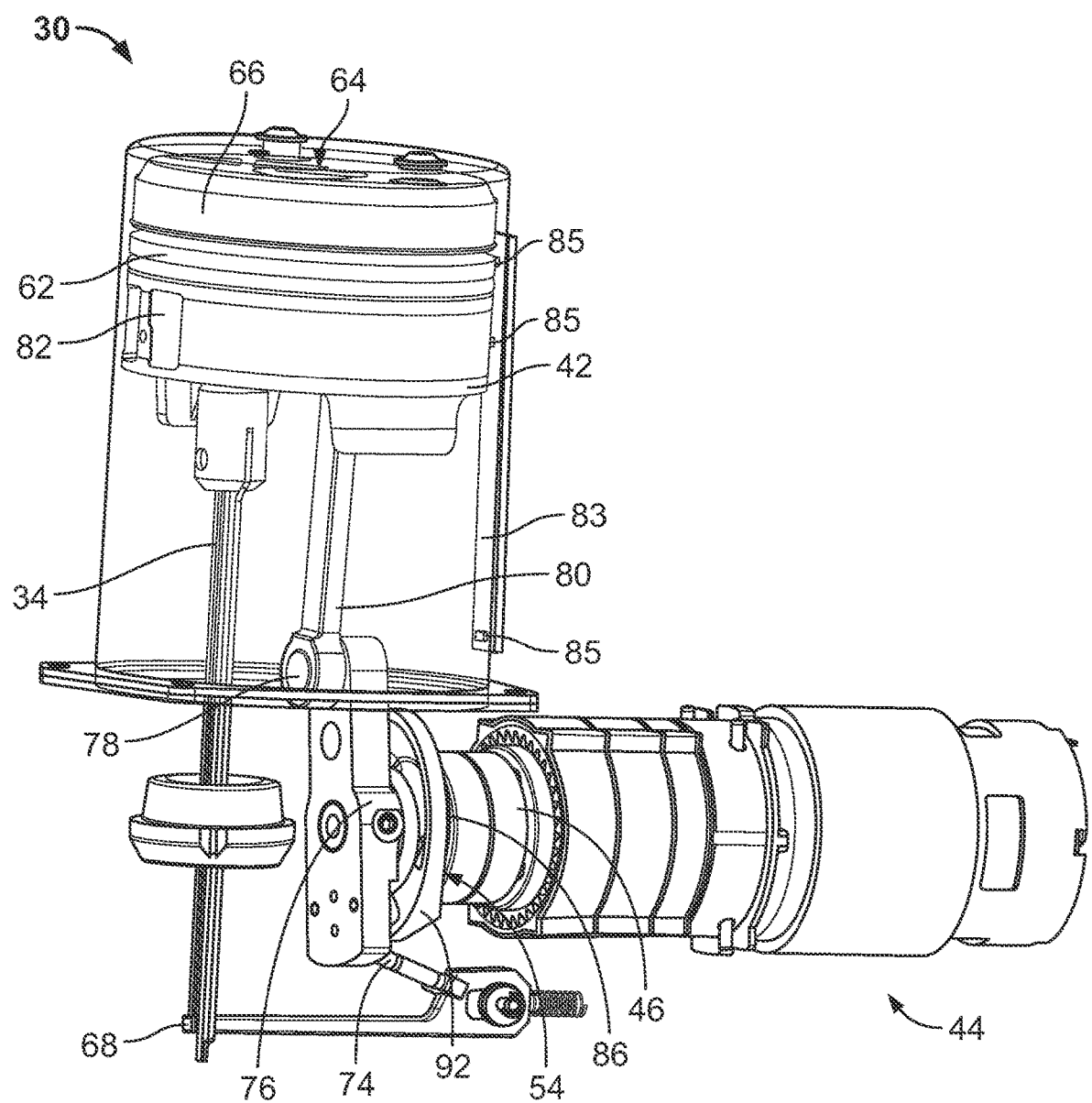
FIG. 3 is a perspective view of a portion of the powered fastener driver of FIG. 1 with a portion of a cylinder removed to illustrate a crank arm assembly and a latch, in accordance with an embodiment of the disclosure.
Figure 5:
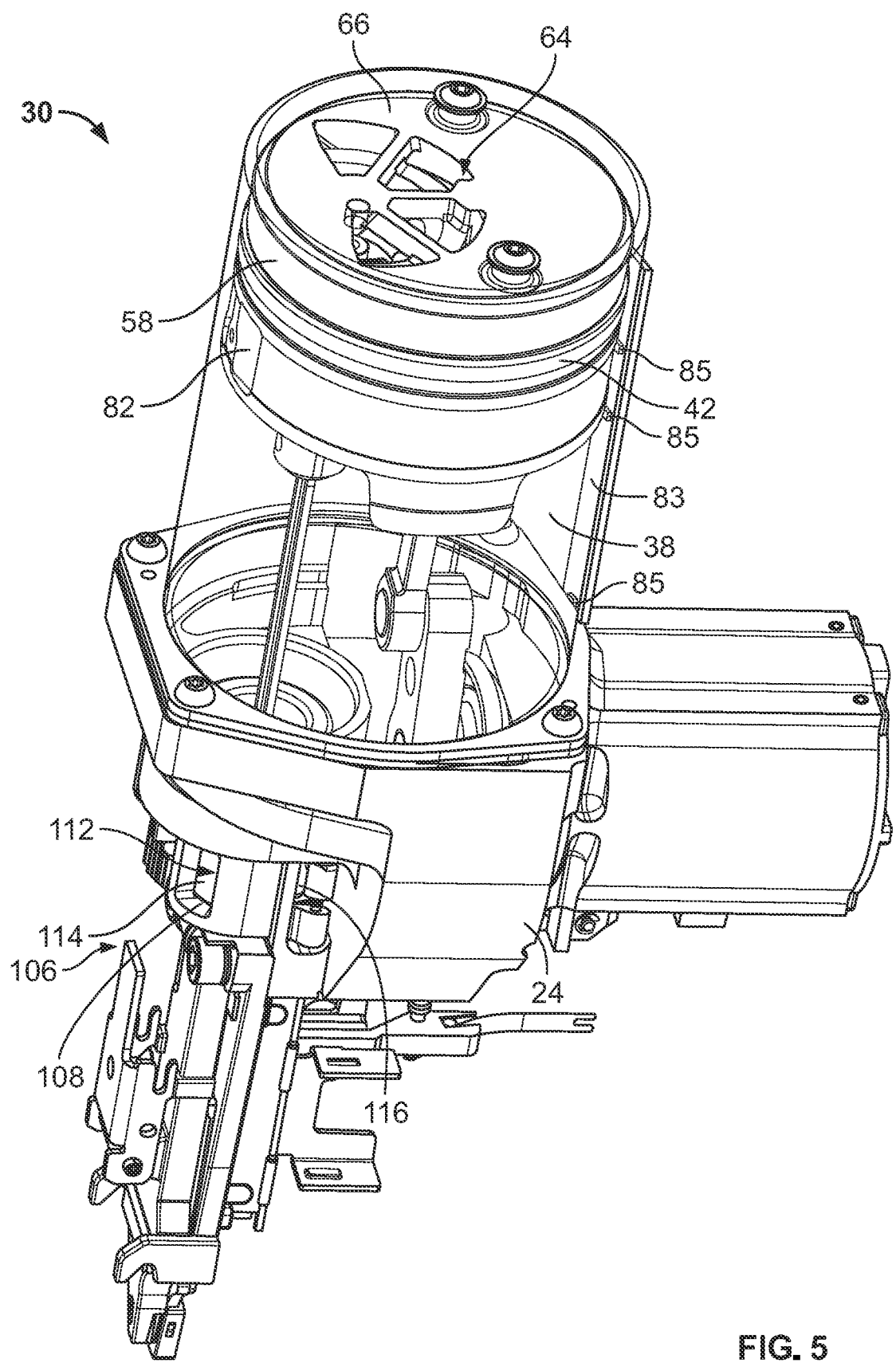
FIG. 5 is a perspective view of a portion of the powered fastener driver of FIG. 1 with a portion of a cylinder removed to illustrate cylinder head forming a passage between a compression cylinder and a driver cylinder of the onboard compressor, in accordance with an embodiment of the disclosure.

As shown in FIGS. 2 and 5, the smaller drive cylinder 58 at least partially extends into the larger compression cylinder 38 such that the compressor piston 42 surrounds the entire drive cylinder 58. By nesting the drive cylinder 58 within the compression cylinder 38, fully or partially, the size and/or weight of the fastener driver 10 may be advantageously reduced for improved handling, manufacturability, and/or the like. The drive cylinder 58 and the compression cylinder 38 are in fluid communication through a passage 64 (FIGS. 3 and 5). The passage 64 allows for the transmission of pressure between the two cylinders 38, 58. In the illustrated embodiment, a cylinder head 66 is coupled to a distal end (e.g., an upper end) of the compression cylinder 38 and includes a plurality of apertures that define the passage 64, which allows for continuous fluid communication between the two cylinders 38, 58. In other words, there is no valve within the passage 64.

Figure 4:
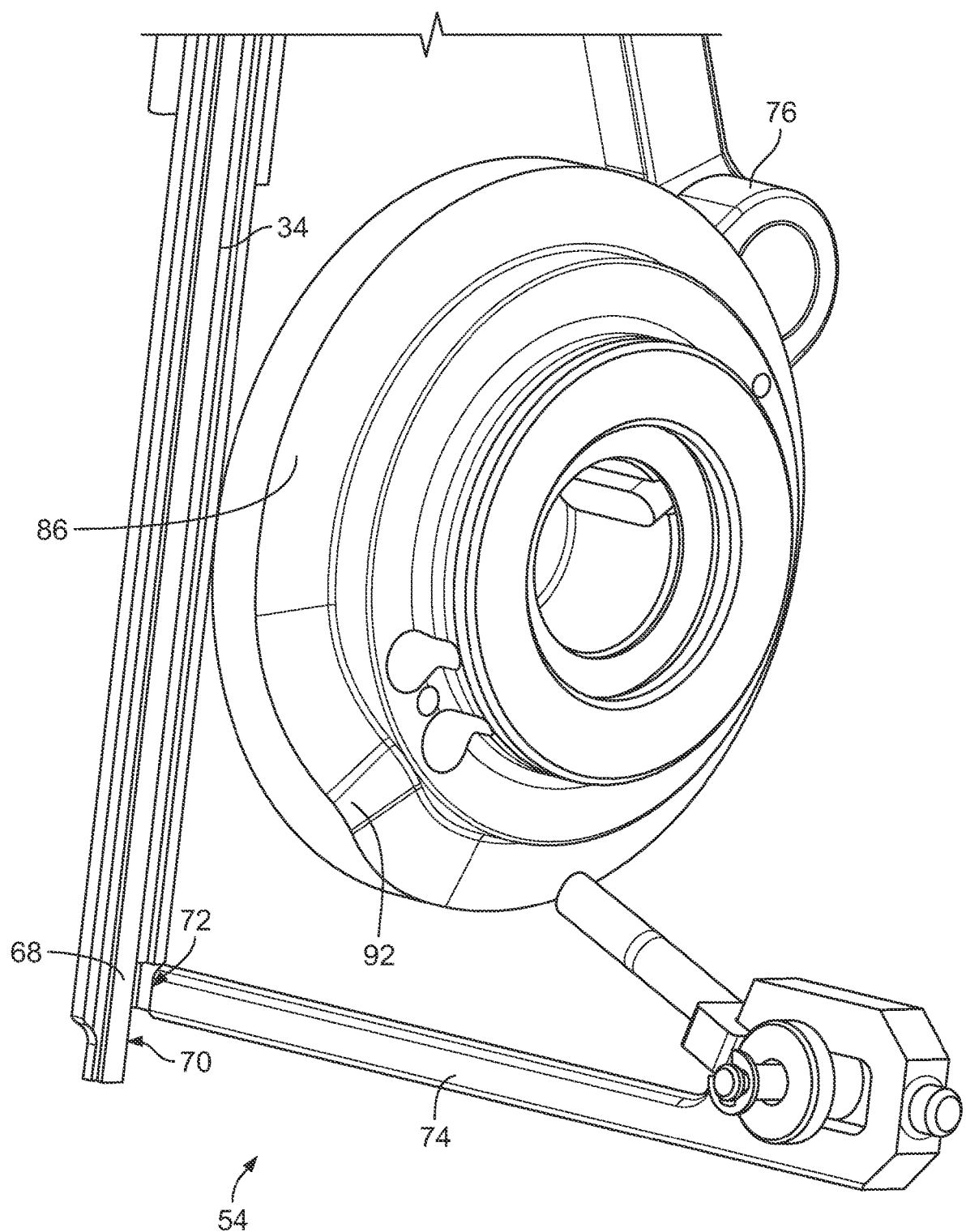
FIG. 4 is an enlarged perspective view of a portion of the powered fastener driver FIG. 3, illustrating the latch in a locked position, in accordance with an embodiment of the disclosure.

As shown in FIGS. 3, 4, and 5, the powered fastener driver 10 may additionally include a latch 68 supported within the structural housing 24, which extends between the drive mechanism 44 and the drive blade 34. The latch 68 is movable between a locked position, in which the latch 68 engages the drive blade 34 to secure the drive piston 62 in the TDC position, and an unlocked position, in which the latch 68 disengages the drive blade 34 so the drive piston 62 is able to move from the TDC position to the BDC position to perform a fastener driving operation. In the illustrated embodiment, the drive blade 34 includes a slot 70, a biasing member 74 is configured to bias the latch 68 towards the locked position, and the latch 68 includes a recess 72. When the latch 68 is in the unlocked position, the recess 72 is aligned with the drive blade 34. When the latch 68 is in the locked position, the slot 70 formed in the drive blade 34 is configured to receive a portion of the latch 68 to restrict movement of the drive blade 34. When the crank arm assembly 54 moves the compressor piston 42 towards the TDC position, the crank arm assembly 54 moves the latch 68 to the unlocked position, which releases the blade 34 to initiate a fastener driving operation.

Figure 6:
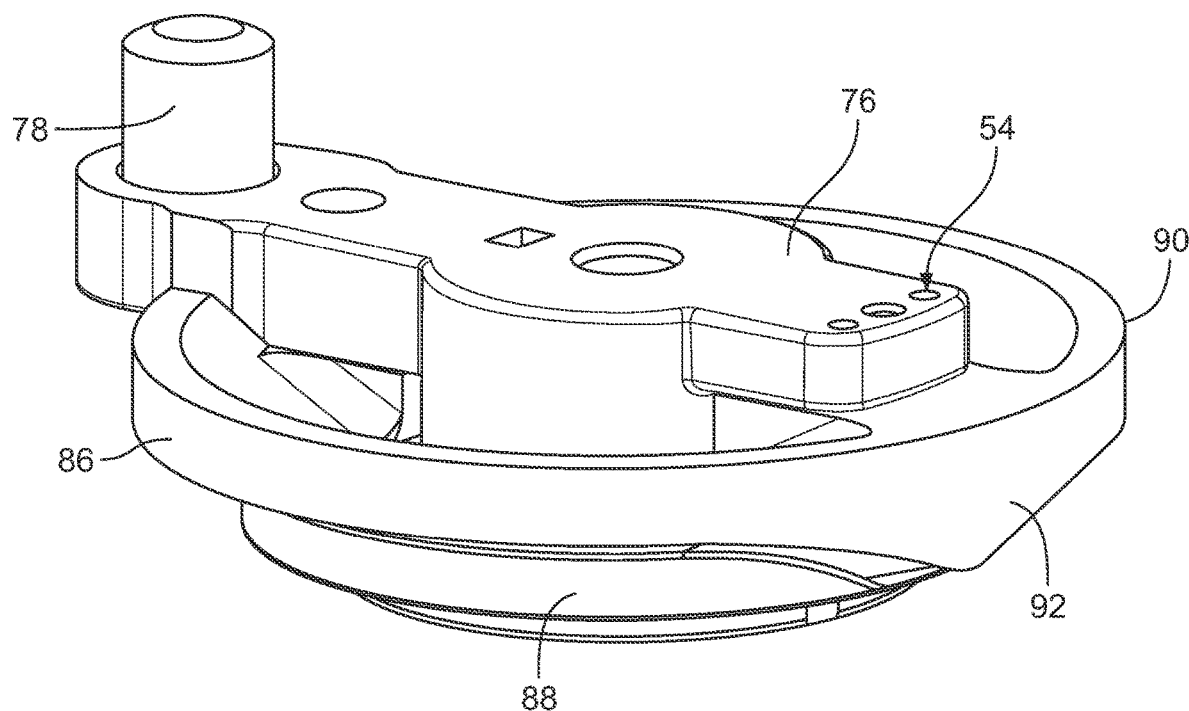
FIG. 6 is a top, perspective view of a portion of the crank arm assembly of the powered fastener driver of FIG. 1, illustrating a cam lobe formed on a cam of the crank arm assembly, in accordance with an embodiment of the disclosure.

As shown in FIGS. 3, 4, and 6, the crank arm assembly 54 includes a crank arm 76 with a pin 78 and a connecting rod 80 pivotably coupled to the pin 78 at one end and a piston pin 82 (FIG. 2) at an opposite end. The piston pin 82 may include an end-mounted magnet (not shown) proximate to a printed circuit board assembly (PCBA) 83 located on the exterior of compression cylinder 38 (FIGS. 3 and 5). The PCBA 83 may include one or more sensors 85 (e.g., Hall switches, Hall effect sensors, optical sensors, ultrasonic sensors, photoelectric sensors, and/or any other suitable position sensor) in electronic communication with a control system 300, described in more detail below, and configured to be activated by the end-mounted magnet of piston pin 82. Once activated by the end-mounted magnet of piston pin 82, each of the one or more sensors 85 may be further configured to generate a signal indicative of the position of the compressor piston 42 (FIGS. 3 and 5) (based on activation) and transmit the signal to the control system 300. In some embodiments, the signal may be a dataset indicative of a result of the operation cycle based on the position of the compressor piston 42.

Figure 7:
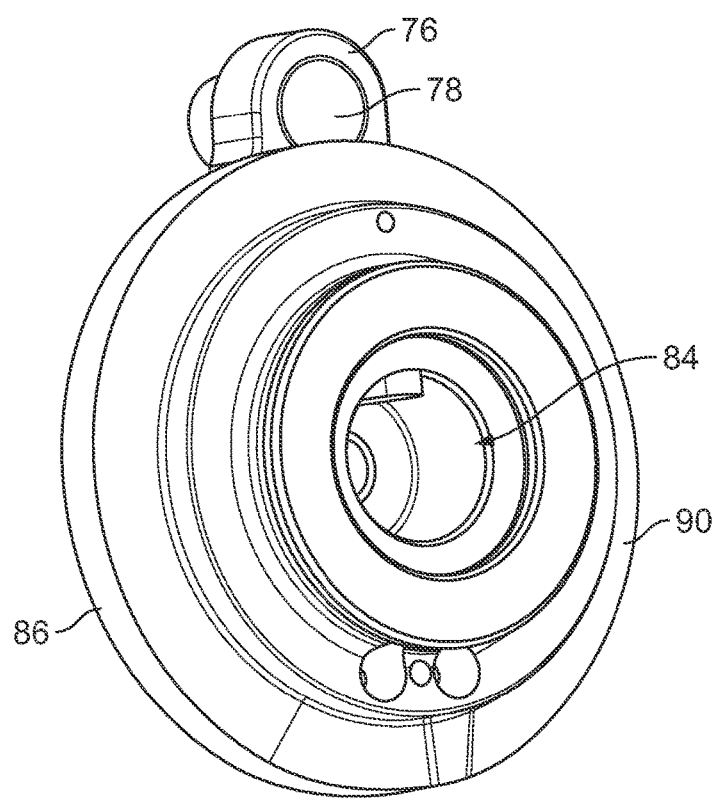
FIG. 7 is a bottom, perspective view of the crank arm assembly of the powered fastener driver of FIG. 1, illustrating a finger and a hub formed on a crank arm of the crank arm assembly, in accordance with an embodiment of the disclosure.
Figure 8:
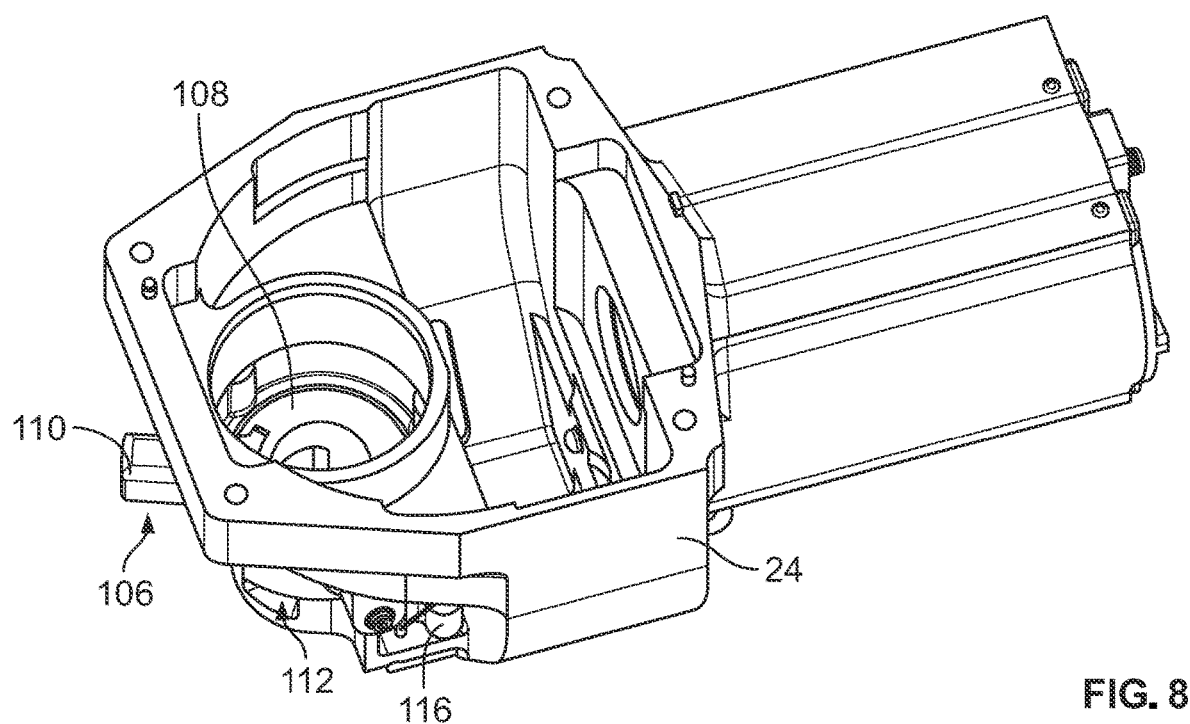
FIG. 8 is a top, perspective view of a structural housing of the powered fastener driver of FIG. 1, in accordance with an embodiment of the disclosure.

With reference to FIG. 7, the crank arm 76 may include a hub 84 coupled for co-rotation with an output shaft of the transmission 50 (e.g., by way of a key and keyway arrangement). With reference to FIG. 6, the crank arm assembly 54 also includes a cam 86 coupled for co-rotation with the crank arm 76. The cam 86 includes a first side 88, a second side 90 opposite the first side 88, and a cam lobe 92 formed on the first side 88. In the illustrated embodiment, the cam lobe 92 is formed as a protrusion on the first side 88 of the cam 86 that extends in an axial direction and parallel with a rotational axis of the crank arm 76 and cam 86. In addition, the crank arm 76 is coupled to the second side 90 of the cam 86 and the cam lobe 92 is formed on the opposite, first side 88. In other words, the first side 88 and the cam lobe 92 face the transmission 50, while the second side and crank arm 76 face the drive cylinder 58.

As explained in further detail below, one end of the latch 68 is biased against the first side 88 of the cam 86, resulting in sliding movement between the latch 68 and the cam 86 as the cam 86 rotates. As the latch 68 slides up the cam lobe 92, the latch 68 is moved towards the unlocked position. In this regard, the latch 68 behaves as a follower in response to rotation of the cam 86. It should be appreciated that a complete fastener driving cycle may be defined as the compressor piston 42 starting at a position near the BDC position, moving to the TDC position, and finishing at a position at or near the BDC position, while the drive piston 62 starts at TDC position, moves to the BDC position when the compressor piston 42 reaches the TDC position, and finishes in the TDC position. For the compressor piston 42 to execute the complete fastener driving cycle, the crank arm assembly 54 rotates 360 degrees. To initiate a subsequent complete fastener driving cycle, the rotation of the crank arm assembly 54 may continue in the same direction of rotation. In other embodiments, the rotation of the crank arm assembly 54 may be reversed by the motor 46 to initiate the subsequent complete fastener driving cycle. To accomplish this, the motor 46 may rotate the crank arm 76 and cam 86 alternately in a clockwise and a counterclockwise manner (e.g., clockwise then counterclockwise) to complete consecutive fastener driving cycles.

As shown in FIGS. 8-10B, the fastener driver 10 includes a back-pressure adjustment mechanism 106 supported within the structural housing 24. The back-pressure adjustment mechanism 106 is configured to vary the amount of air exhausted from the drive cylinder 58 beneath the drive piston 62 (i.e., on a side of the drive piston 62 opposite the cylinder head 66) during a fastener driving cycle. Because the fastener driver 10 does not include any pressure valves, the pressure of compressed air developed within the compression cylinder 38 is the same as the pressure acting on the drive piston 62. As such, the back-pressure adjustment mechanism 106 can selectively increase or decrease the amount of air exhausted from the drive cylinder 58 beneath the drive piston 62 as it moves from the TDC position to the BDC position, thus either reducing or increasing, respectively, the back pressure acting on the drive piston 62 during a fastener driving cycle. In this way, the force acting on the drive piston 62 may be increased or decreased for driving different sizes of fasteners (e.g., 16 gauge nails, 18 gauge nails, 1 inch, 2 inch, and/or the like) to appropriate distances within a workpiece to make the fastener driver 10 suitable for use in a variety of different fastening applications.

The back-pressure adjustment mechanism 106 includes a basket 108 rotatably supported within the structural housing 24, an adjustment member 110 extending from the basket 108 through the structural housing 24, and an opening 112 formed in the basket 108 to expose a central bore within the basket 108. The opening 112 in the basket 108 selectively aligns with a window 114 formed in the structural housing 24 which, in turn, is in fluid communication with the external atmosphere. Rotation of the basket 108 (e.g., via the adjustment member 110), adjusts the positioning of the opening 112 relative to the window 114, and thus the effective cross-sectional area of the opening 112 that is exposed to the atmosphere. Adjusting the size of the exposed opening 112, therefore, adjusts the volumetric flow rate of air that is exhausted from the drive cylinder 58 beneath the drive piston 62, through the exposed opening 112 and window 114. For example, reducing the size of the exposed opening 112 reduces the flow rate of air that can be exhausted through the opening 112, which creates a larger back-pressure acting against the drive piston 62 and thus reduces the net force acting on the drive piston 62 during a fastener driving cycle. Increasing the size of the exposed opening 112 increases the amount of air that can be exhausted through the opening 112, which creates a smaller back-pressure acting against the drive piston 62 and thus increases the net force acting on the drive piston 62 during a fastener driving cycle.

Figure 9:
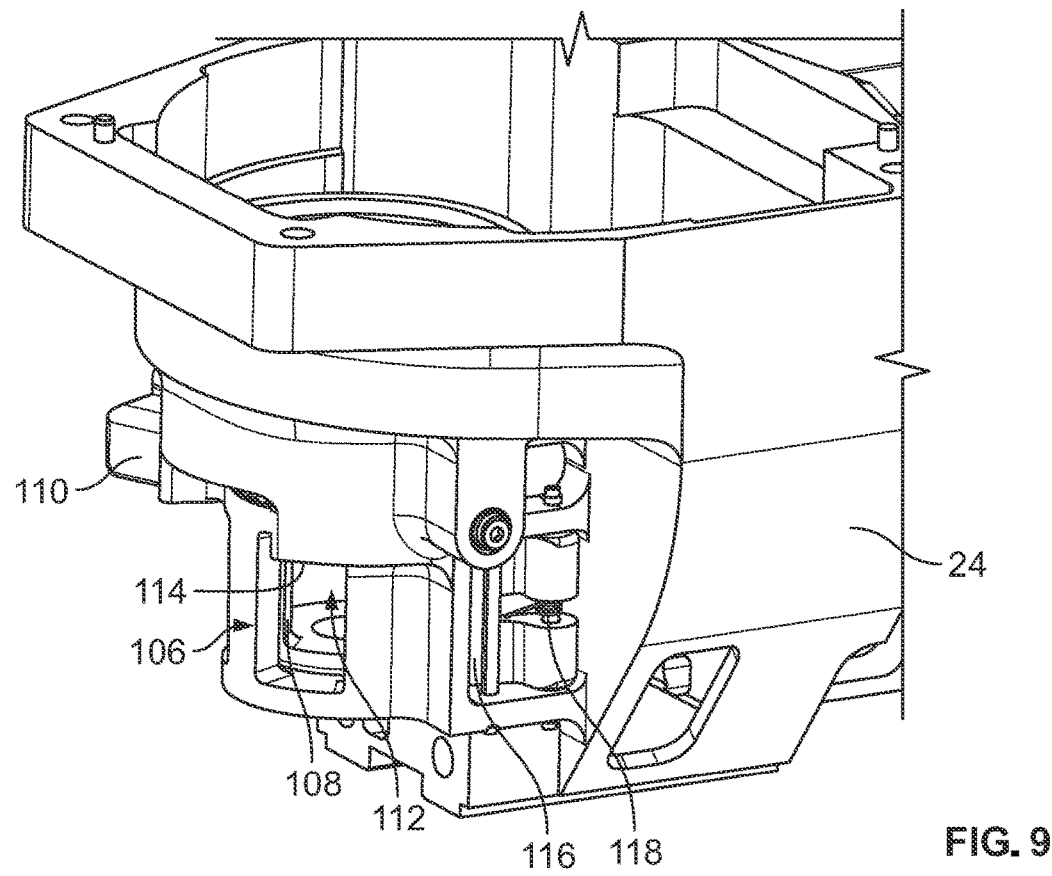
FIG. 9 is a perspective view of the structural housing of the powered fastener driver of FIG. 1, illustrating a back-pressure adjustment mechanism and a check door, in accordance with an embodiment of the disclosure.
Figure 10A:
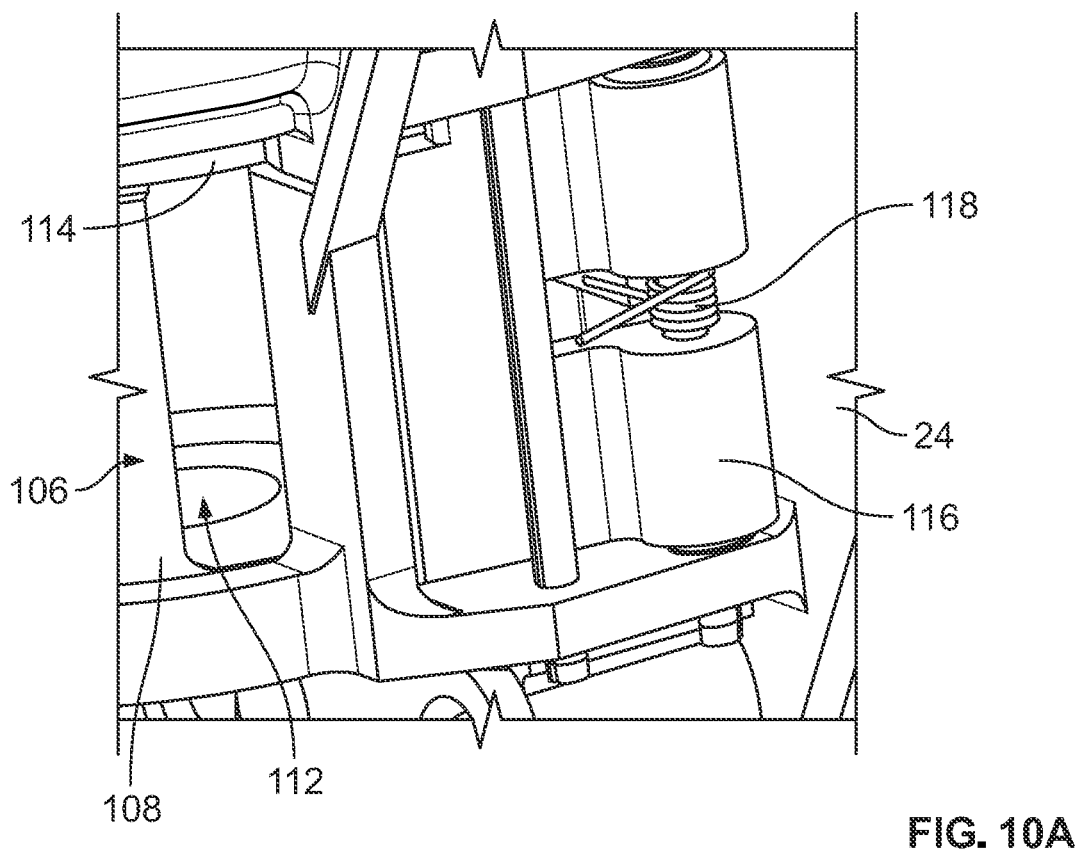
FIG. 10A is a partial perspective view of the structural housing of the powered fastener driver of FIG. 1, illustrating the check door in a closed position, in accordance with an embodiment of the disclosure.
Figure 10B:
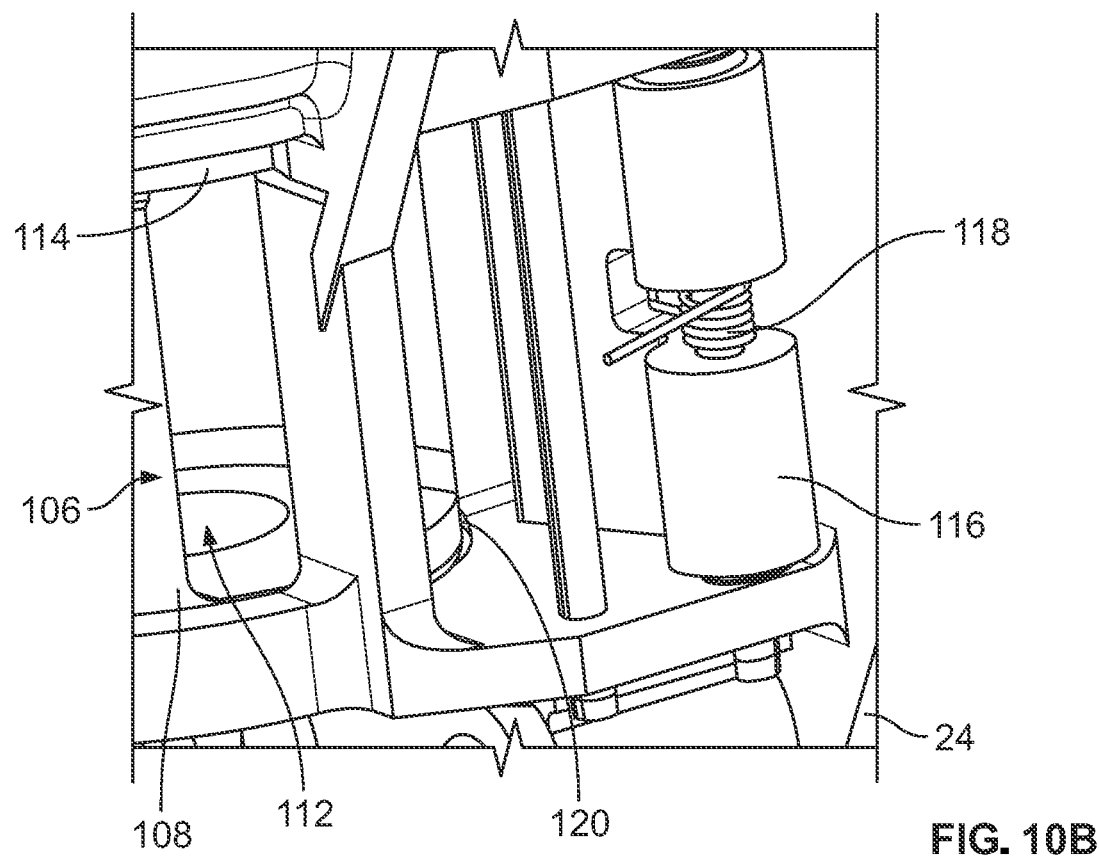
FIG. 10B is a partial perspective view of the structural housing of the powered fastener driver of FIG. 1, illustrating the check door in an open position, in accordance with an embodiment of the disclosure.

With continued reference to FIGS. 9, 10A, and 10B, fastener driver 10 may additionally include a check door 116 and a biasing member 118 (e.g., a torsion spring, and/or the like) that biases the check door 116 towards a closed position (FIG. 10A), which blocks flow (e.g., of air) through a second window 120 (FIG. 10B) of the basket 108. In the closed position, the second window 120 is closed and atmospheric air is prevented from exiting the drive cylinder 58 via the basket 108 in response to the drive piston 62 moving from the TDC position toward the BDC position. The check door 116 may be positioned adjacent the back-pressure adjustment mechanism 106 and be movable to an open position where the second window 120 in the basket 108 is opened to permit atmospheric air to enter the drive cylinder 58 via the basket 108 in response to the drive piston 62 moving from the BDC position toward the TDC position. More specifically, during the movement of the drive piston 62 from the BDC position toward the TDC position, a vacuum is created within the drive cylinder 58 beneath the drive piston 62 that pulls the check door 116 to the open position via force created by a pressure differential as the drive piston 62 moves forward the TDC position. When the check door 116 is in the open position, the entire opening 112 of the basket 108 may be exposed to the atmosphere (via the first and second windows 114, 120 in the structural housing 24) to cause replacement air to enter the drive cylinder 58 beneath the drive piston 62. Once the drive piston 62 is returned the TDC position, the vacuum acting on the check door 116 to hold the door 116 in the open position may dissipate, causing the biasing member (e.g., spring) 118 to rebound and return the check door 116 to a closed position, thereby closing the second window 120, and resetting the driver 10 for a subsequent fastener driving cycle. As the drive piston 62 and the drive blade 34 return to the TDC position, the biasing member 74 urges the latch 68 into engagement with the slot 70 of the drive blade 34, which locks the drive blade 34 in a position for the subsequent fastener driving cycle.

At the beginning of a fastener driving cycle, the latch 68 is configured to maintain the drive piston 62 in the TDC position, while the compressor piston 42 is in the BDC position. As described in further detail below, a control system 300 may determine the position of the compressor piston 42 based on the activation of the one or more sensors 85 to ensure that the compressor piston 42 is in the BDC position and the crank arm 76 is in a starting position at the beginning of a fastener driving cycle. If the compressor piston 42 is determined to not be in the near BDC position at the end of a fastener driving cycle (i.e., an abnormal cycle) based on the activation of the one or more sensors 85, the control system 300 may control rotation of the motor 46 in a direction (e.g., clockwise or counter-clockwise) to drive the compressor piston 42 toward its BDC position prior to the beginning of a subsequent fastener driving cycle.

In some embodiments, an abnormal cycle may occur if the trigger 26 and/or the work contact switch (not shown) is released before the end of a fastener driving cycle. In other embodiments, an abnormal cycle may occur if the battery pack 20 is disconnected from the power tool or if the battery pack 20 shuts down during a fastener driving cycle. In response to determining an abnormal cycle, the subsequent operation cycle may be a recovery cycle. In some embodiments, a recovery cycle may be initiated by the user-actuated trigger 26 and/or actuation of the work contact switch (not shown). In other embodiments, a recovery cycle may be initiated by other suitable user inputs. In some embodiments, upon initiation of a recovery cycle, a flag may be set within a memory of the control system 300 to indicate that the previous operation cycle ended abnormally. The control system 300 may clear the flag once the compressor piston 42 is reset to the BDC position. Once a subsequent drive cycle is initiated, the control system 300 may check the memory for the flag before completing the subsequent operation cycle. In some embodiments, the control system 300 may perform an additional check, based on the state of the one or more sensors 85, to determine if the starting position of compressor piston 42 is acceptable relative to the BDC position. In some embodiments, a timer may be used to determine a timeout period to end a recovery cycle if the position of the compressor piston 42 cannot be detected relative to the BDC position within the timeout period. The motor 46 may then be rotated in an opposite direction to drive the compressor piston 42 upward toward its TDC position by the crank arm assembly 54. In some embodiments, if an abnormal cycle is determined and the compressor piston 42 stops at a mid-cycle position or the TDC position, the recovery cycle may be split into at least two or more recovery cycles.

As the compressor piston 42 travels upward, the air in the compression cylinder 38 and above the compressor piston 42 is compressed, while the latch 68 maintains the drive piston 62 in the TDC position. Once the crank arm 76 and cam 86 reaches a predetermined angular position coinciding with the TDC position of the compressor piston 42, the latch 68 is moved into its unlocked position by the cam 86, which releases the drive blade 34 as described above. After the drive blade 34 is released by the latch 68, the drive piston 62 is accelerated downward within the drive cylinder 58 by the compressed air within the compression cylinder 38, which causes the drive blade 34 to impact a fastener held in the magazine 14 and drive the fastener into a workpiece until the drive piston 62 reaches the stop member 60 located at the BDC position within the drive cylinder 58.

Upon the drive piston 62 reaching its BDC position, one-half of the fastener driving cycle is complete, and the compressor piston 42 is driven downwards towards the BDC position by the motor 46 and crank arm assembly 54 to complete the fastener driving cycle and ready the fastener driver 10 for a subsequent fastener driving cycle. As the compressor piston 42 is driven through a retraction stroke (i.e., from the TDC position toward the BDC position), a vacuum is created within the compression cylinder 38 and the drive cylinder 58, creating a pressure imbalance on the drive piston 62 and a resultant upward force, causing the drive piston 62 to return to its TDC position. During the movement of the drive piston 62 to the TDC position, the check door 116 opens, which allows replacement air to enter the drive cylinder 58 beneath the drive piston 62 to facilitate return of the drive piston 62 to the TDC position as described above. When the drive piston 62 and the drive blade 34 return to the TDC position, the biasing member 74 urges the latch 68 into the slot 70 of the drive blade 34, which locks the driver blade 34 in position for the subsequent fastener driving cycle.

In the illustrated embodiment, the rotational speed of the motor 46 may be decreased after the fastener driving operation occurs such that the control system 300, described in more detail below, implements a mechanism control scheme to electrically brake the motor 46 (e.g., via the plurality of FETs). In some embodiments, the mechanism control scheme may control the timings of the compressor piston 42 and the drive piston 62 and/or the position of the compressor 42 and the drive piston 62 during the operation cycle. Electrically braking the motor 46 allows the compressor piston 42 to return to the BDC position at a controlled speed for the subsequent fastener driving cycle. During the operation cycle, the one or more sensors 85 may detect signals indicative of the position of the compressor piston 42. The control system 300 may receive the signals indicative of the position of the compressor piston 42 and implement the mechanism control scheme based on the received signals. In some embodiments, a timer may be used to set a timer duration for the complete fastener driving operation (e.g., for the compressor piston 42 to return to the BDC position). Accordingly, for the complete fastener driving cycle, the control system 300 is configured to instruct the motor 46 to drive at one or more periods of motor driving time and brake at one or more periods of motor braking time. In some embodiments, the control system 300 ensures that the compressor piston 42 is returned to the near BDC position prior to the subsequent fastener driving cycle.

Figure 11:
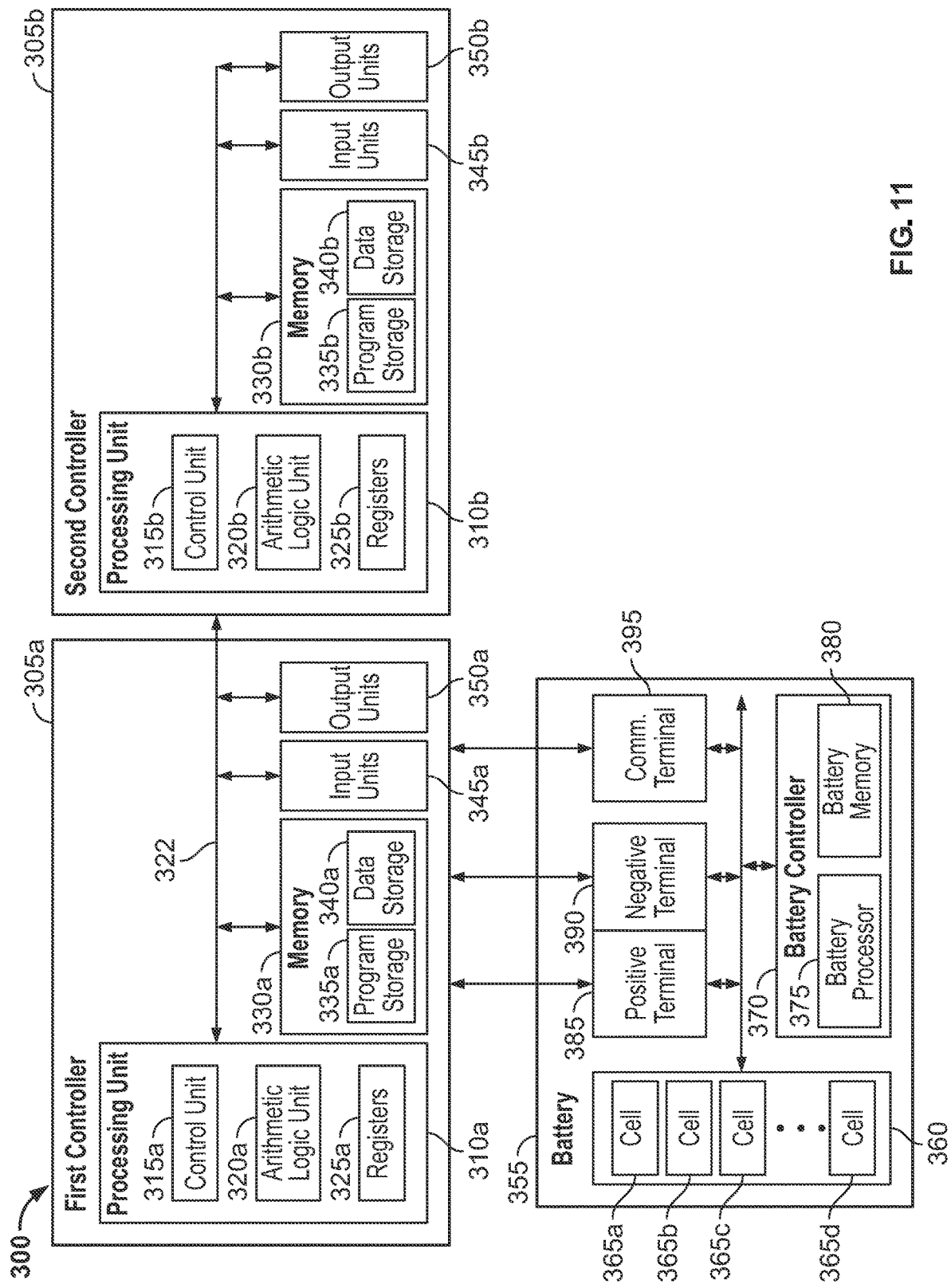
FIG. 11 is a block diagram of a power tool system including a power tool and a battery pack, in accordance with an embodiment of the disclosure.

FIG. 11 is a block diagram of a control system 300 of the powered fastener driver 10, according to some embodiments. In other embodiments, the control system 300 may be used with other power tools (e.g., drills, saws, oscillating tools, and/or the like). The control system 300 may include a first controller 305a and a second controller 305b, as well as other components not pictured in FIG. 11, for example a motor 46, a solenoid, or other mechanical and/or electrical components described above. In other embodiments, the first controller 305a may include a greater number of components or a fewer number of components than the second controller 305b. For example, the first controller 305a and second controller 305b may include an IC chip, PID controller, programmable logic controllers, and/or the like.

In some embodiments, the first controller 305a may include a processing unit 310a comprising a control unit 315a, an arithmetic logic unit 320a, and one or more registers 325a. The first controller 305a may further include a memory 330a consisting of program storage 335a and/or data storage 340a. The memory 330a may be flash memory, random access memory, solid state memory, another type of memory, or a combination of these types. The first controller 305a may further include one or more input units 345a and/or output units 350a. In some embodiments, the one or more input units 345a may be configured to receive a plurality of inputs such as a shark fin switch signal, a work contact switch signal, a mode switch signal, a load voltage signal, a trigger signal, or a control signal from one or more output units 350b. In some embodiments, the one or more output units 350a may be configured to transmit a plurality of outputs such as a battery load test signal, a signal to control a plurality of light-emitting diodes (LEDs), or a signal to control a plurality of FETs of the motor 46.

The first controller 305a may be in electronic communication with the second controller 305b via a communication line 322. For example, the communication line 322 may be a wire, a link communication, and/or the like. The first controller 305a may be further configured to transmit and/or receive data indicative of the status of a fastener driving cycle with the second controller 305b via the communication line 322. The second controller 305b may include a processing unit 310b comprising a control unit 315b, an arithmetic logic unit 320b, and one or more registers 325b. The second controller 305b may further include a memory 330b consisting of program storage 335b and/or data storage 340b. The memory 330b may be flash memory, random access memory, solid state memory, another type of memory, or a combination of these types. The second controller 305b may further include one or more input units 345b and/or output units 350b, for example one or more input/output interfaces, various connections (e.g., a system bus) connecting the components, and/or the like. In some embodiments, the one or more input units 345b may be configured to receive a plurality of inputs such as signals from one or more sensors 85 or a battery voltage signal. In some embodiments, the one or more output units 350b may be configured to transmit a plurality of outputs such as a control signal to one or more input units 345a. The processing unit 310a, 310b may include a microprocessor, a microcontroller, or another suitable programmable device.

The memory 330a, 330b is a non-transitory computer readable medium that includes, for example, a program storage area and a data storage area. The program storage area and the data storage area can include combinations of different types of memory, such as read-only memory ("ROM"), random access memory ("RAM") (e.g., dynamic RAM ["DRAM"], synchronous DRAM ["SDRAM"], etc.), electrically erasable programmable read-only memory ("EEPROM"), flash memory, a hard disk, an SD card, or other suitable magnetic, optical, physical, or electronic memory devices. The processing unit 310a, 310b is connected to the memory 330a, 330b and executes software instructions that are capable of being stored in a RAM of the memory 330a, 330b (e.g., during execution), a ROM of the memory 330a, 330b (e.g., on a generally permanent basis), or another non-transitory computer readable medium such as another memory or a disc. Software included in the implementation of the fastener driver 10 can be stored in the memory 330a, 330b of the controller 305a, 305b. The software includes, for example, firmware, one or more applications, program data, filters, rules, one or more program modules, and other executable instructions. The controller 305a, 305b is configured to retrieve from memory and execute, among other things, instructions related to the control of the fastener driver 10 described herein. In other constructions, the controller 305a, 305b includes additional, fewer, or different components.

A battery pack 355 (e.g., battery pack 20) may include a stack 360 consisting of one or more battery cells 365. In some embodiments, the one or more battery cells 365 are electrically connected to each other in a series-type manner. In other embodiments, the one or more battery cells 365 are electrically connected to each other in a parallel-type manner. In still other embodiments, the one or more battery cells 365 are electrically connected to each other in a combination of a series-type and a parallel-type manner. The battery pack 355 may further include a battery pack controller 370 consisting of a battery processor 375 and a battery memory 380. The battery pack 355 may further include a positive battery terminal 385 and a negative battery terminal 390. The positive battery terminal 385 and the negative battery terminal 390 may be configured to electrically and/or mechanically couple to corresponding terminals of the powered fastener driver 10. In some embodiments, the battery pack 355 includes a communication terminal 395, which may be configured to electrically, mechanically, and/or communicatively couple to one or more communication terminals of the powered fastener driver 10.

In some embodiments, such as the block diagram of FIG. 11, the one or more battery cells 365 are connected to the battery pack controller 370. The battery pack controller 370 controls the power delivered to the positive battery terminal 385 and the negative battery terminal 390 (for example, via control of a discharge field-effect transistor (FET), a charge FET, and/or other FETs located within the battery pack). In some embodiments, the battery pack controller 370 controls the power by allowing or prohibiting power. Additionally, in some embodiments, the battery pack controller 370 controls the power by allowing a percentage of power generated by the one or more battery cells 365 to be output. In some embodiments, the amount of power delivered between the battery terminals 385, 390 is approximately 100% of power possibly generated by the one or more battery cells 365.

Figure 12:
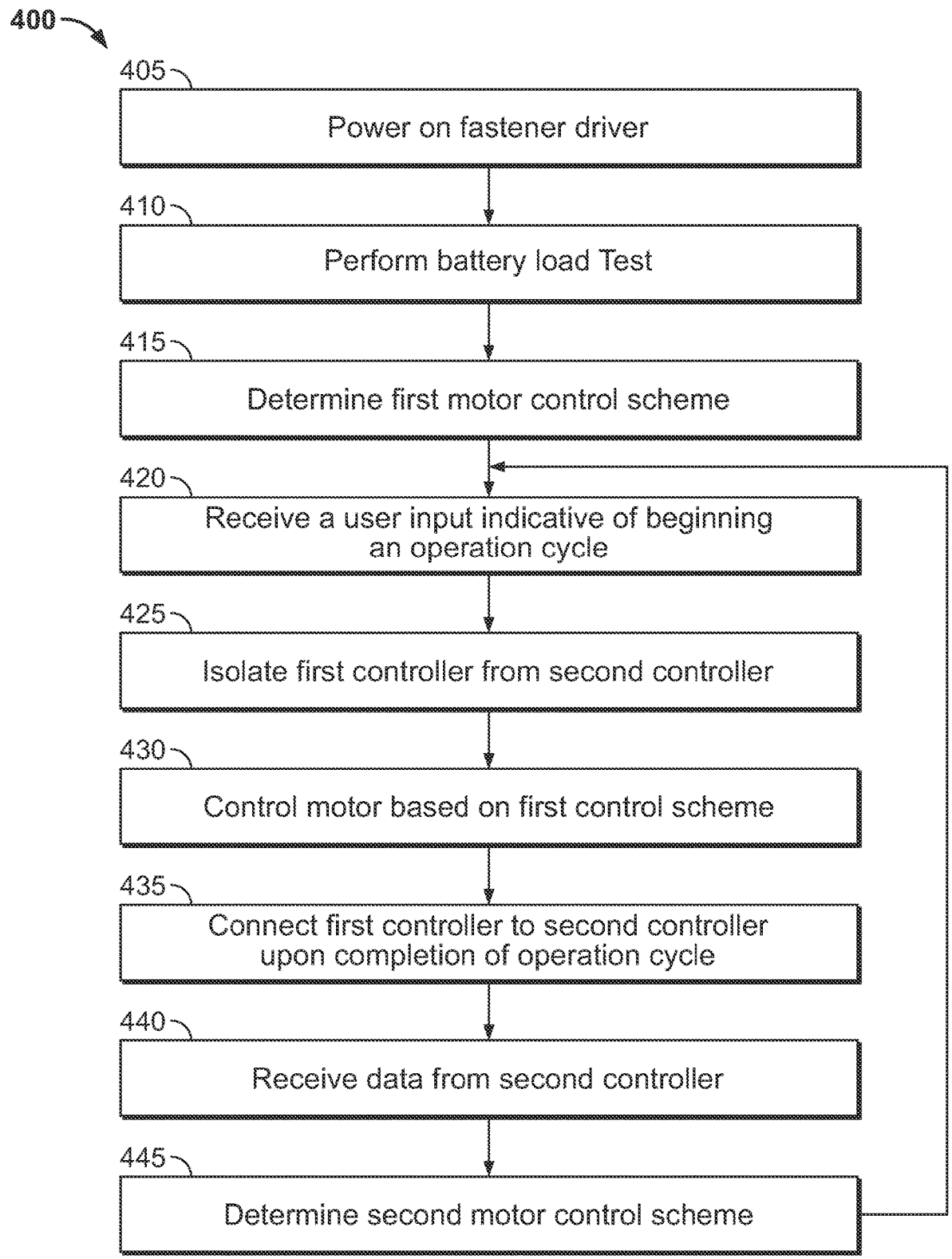
FIG. 12 is a flow chart of a method for controlling the motor of a power tool, in accordance with an embodiment of the disclosure.

FIG. 12 is an exemplary flowchart illustrating a method 400 for controlling a motor (e.g., the motor 46) of a power tool (e.g., the powered fastener driver 10), according to some embodiments. It should be understood that the order of the steps disclosed in the method 400 could vary. For example, additional steps may be added to the process and not all of the steps may be required, or steps shown in one order may occur in a second order. The method 400 begins at step 405 when the first controller 305a receives a signal to begin an operation of the power tool (e.g., the power tool is powered on). The method 400 then proceeds to step 410.

At step 410, the first controller 305a performs a battery load test on the battery pack 355 prior to a fastener driving cycle. The battery load test may include determining whether the battery pack 355 is electrically, mechanically, and/or communicatively coupled to the power tool when the first controller 305a determines that the battery pack 355 includes a communication terminal 395. If the first controller 305a determines that the battery pack 355 does not include a communication terminal 395, the first controller 305a performs load testing on the battery pack 355 by measuring a voltage of the battery pack 355 prior to a fastener driving cycle. The method 400 may further include determining, via the first controller 305a, an internal resistance of the battery pack 355. The internal resistance may be determined by measuring a voltage and/or a current of the battery pack 355 prior to a fastener driving cycle. In some embodiments, the internal resistance may be determined based on the one or more battery cells 365 and/or the FETs and/or other electronical or physical components of the battery pack 355. The method 400 may further include determining, via the first controller 305a, a type of battery pack based on the determined internal resistance. If the first controller 305a determines that the battery pack 355 does include a communication terminal 395, the method 400 may include determining a type of battery pack by receiving a signal from the battery pack communication terminal. The method 400 then proceeds to step 415.

At step 415, the first controller 305a determines a first mechanism control scheme. The first mechanism control scheme may include determining a timing of one fastener driving cycle of the motor 46 (coinciding with one fastener driving cycle of the fastener driver 10). The first mechanism control scheme includes electrically controlling the motor 46 to drive the crank arm assembly 54. In some embodiments, the motor 46 drives the crank arm assembly 54 in a first direction. The first mechanism control scheme may further include determining a duty cycle of a pulse-width modulated (PWM) signal to apply to the plurality of FETs, connected to the one or more output units 350a, of the motor 46 to drive the crank arm assembly 54. The first mechanism control scheme may further include determining a duty cycle of a PWM signal to apply to the plurality of FETs of the motor 46 to electrically brake the crank arm assembly 54. Once the first mechanism control scheme is determined, the method 400 proceeds to step 420.

At step 420, the first controller 305a receives a signal from a first user input, via the one or more input units 345a, indicative of the beginning of a fastener driving cycle (e.g., the beginning of an operation cycle). In some embodiments, the signal to begin a fastener driving cycle of the motor 46 may be based on an actuation of the trigger 26 or another switch of the power tool. In some embodiments, the first controller 305a may receive a signal from a mode switch (not shown) indicative of a mode of the fastener driver 10 prior to the actuation of the trigger 26. In other embodiments, the power tool may begin the fastener driving cycle in response to an actuation of the trigger 26 in combination with an actuation of a work contact element and/or actuation of a second trigger (e.g., a sharkfin switch). Actuation of the work contact element and/or actuation of the second trigger may transmit a signal to the first controller 305a the beginning of a fastener driving operation. The method 400 then proceeds to step 425.

At step 425, the first controller 305a may be isolated from the second controller 305b via communication line 322. In some embodiments, the communication line 322 is an electrical connection between one or more output units 350b and one or more input units 345a. For example, the one or more output units 350b may be temporarily disconnected from the one or more input units 345a during the operation cycle. The first controller 305a generates a signal, in response to the actuation of the trigger 26, to initiate isolation of the first controller 305a from the second controller 305b through the hardware of the first controller 305a (i.e., via the communication line 322 or the electrical connection between one or more output units 350b and one or more input units 345a). Isolating the first controller 305a from the second controller 305b prevents the communication of data indicative of the status of the fastener driving cycle, as further described below, during the fastener driving cycle. In some embodiments, the isolation of the first controller 305a from the second controller 305b actuates a timer of the first controller 305a corresponding to the timing of one fastener driving cycle of the motor. The one fastener driving cycle may be the time between when the motor 46 begins driving the crank arm assembly 54 from a starting position (e.g., when the compressor piston 42 is at or near the BDC position) to when the crank arm assembly 54 drives the compressor piston 42 to complete a fastener driving cycle (e.g., when the compressor piston 42 returns to the BDC position). Once the method 400 isolates the first controller 305a from the second controller 305b, the method 400 proceeds to step 430.

At step 430, the first controller 305a controls the motor 46 (in some embodiments, while the first controller 305a is isolated from the second controller 305b) based on the first control scheme determined in step 415 via the one or more output units 350a. At least one of the one or more output units 350a is electrically connected to the motor 46. Based on the timing of the fastener driving cycle, the first controller 305a determines a plurality of time intervals (e.g., a first time, a second time, a third time, a fourth time, etc.). The first mechanism control scheme further includes driving the motor 46 and electrically braking the motor 46 at the plurality of determined time intervals for a plurality of durations corresponding to a duty cycle of a PWM signal. Electrically braking the motor 46 may include electrically shorting the lead wires of the motor 46 together for a determined duration. The method 400 further includes applying a series of voltage pulses to the motor 46. For example, the voltage pulses may correspond to a duty cycle of a PWM signal. For example, in a complete fastener driving cycle, the first controller 305a applies a PWM signal to drive the motor 46 at a first time (e.g., a first driving time interval) for a first duration (e.g., at a first duty cycle) (i.e., to compress air via the compressor piston 42 and release the drive piston 62), applies a PWM signal to electrically brake the motor 46 at a second time (e.g., a first braking time interval) for the first duration (i.e., to slow or stop the motor 46 and allow residual pressure to vent), applies a PWM signal to drive the motor 46 at a third time (e.g., a second driving time interval) for a third duration (e.g., at a second duty cycle) (i.e., to return the compressor piston 42 to the BDC position and create a vacuum to reset the drive piston 62 to the TDC position), and applies a PWM signal to electrically brake the motor 46 at a fourth time (e.g., a second braking time interval) for the second duration (i.e., to stop the compressor piston 42 at or near the BDC position for the subsequent fastener driving cycle). As such, this ensures the compressor piston 42 is returned to the BDC position prior to the subsequent fastener driving cycle.

In some embodiments, the motor 46 drives the crank arm assembly 54 in a first direction in a first fastener driving cycle of the motor 46, wherein one fastener driving cycle is the time between when the motor 46 begins driving the crank arm assembly 54 from a starting position (e.g., when the compressor piston 42 is at or near the BDC position) to when the crank arm assembly 54 drives the compressor piston 42 to reach the TDC position. The motor 46 may then drive the crank arm assembly 54 in a second direction, opposite the first direction, in a second fastener driving cycle of the motor 46. The motor 46 may alternatively drive the crank arm assembly 54 in this fashion in alternative cycles. For example, in the first, third, fifth, and so-on cycles, the motor 46 may drive the crank arm assembly 54 in a clockwise direction, while in the second, fourth, sixth, and so-on cycles, the motor 46 may drive the crank arm assembly 54 in a counterclockwise direction. The method 400 then proceeds to step 435.

At step 435, the first controller 305a determines the completion of a fastener driving cycle based on the completion of the first mechanism control scheme. The completion of the mechanism control scheme is determined by the compressor piston 42 returning to the near BDC position. In some embodiments, the completion of the fastener driving cycle may correspond to the end of the actuation of the trigger 26. In other embodiments, the completion of the fastener driving cycle may correspond to the end of the timer of the first controller 305a. Upon completion of the fastener driving cycle, the first controller 305a terminates the signal indicative of the hardware isolation of the first controller 305a from the second controller 305b via the communication line 322 allowing data communication between the first controller 305a and the second controller 305b. The method then proceeds to step 440.

At step 440, the first controller 305a receives data indicative of the fastener driving cycle corresponding to the first mechanism control scheme from the second controller 305b. In some embodiments, the second controller 305b transmits the data via the communication line 322 only after the completion of the fastener driving cycle. The method 400 then proceeds to step 445. At step 445, the first controller 305a determines a second mechanism control scheme based on the data received from the second controller 305b. In some embodiments, the first mechanism control scheme is adjusted based on the data received indicative of the fastener driving cycle to determine the second control scheme. In other embodiments, the second control scheme may be determined solely based on the data received by the first controller 305a. Upon the determination of the second control scheme, the method 400 returns to step 420 where the first controller 305a waits for a signal indicative of the beginning of a second fastener driving cycle. In some embodiments, the fastener driver 10 may wait to begin the second fastener driving cycle until a second actuation of the trigger 26 or other switch occurs. The method 400 may be advantageous over existing designs because the battery load test and the adjustment of the mechanism control scheme based on previous operation cycles produces a more reliable user experience over a range of battery packs. By performing the battery load test and adjusting the mechanism control scheme based on previous operation cycles, each mechanism control scheme can be altered individually and precisely based on the results of each operation cycle of the fastener driver 10.

Figure 13:
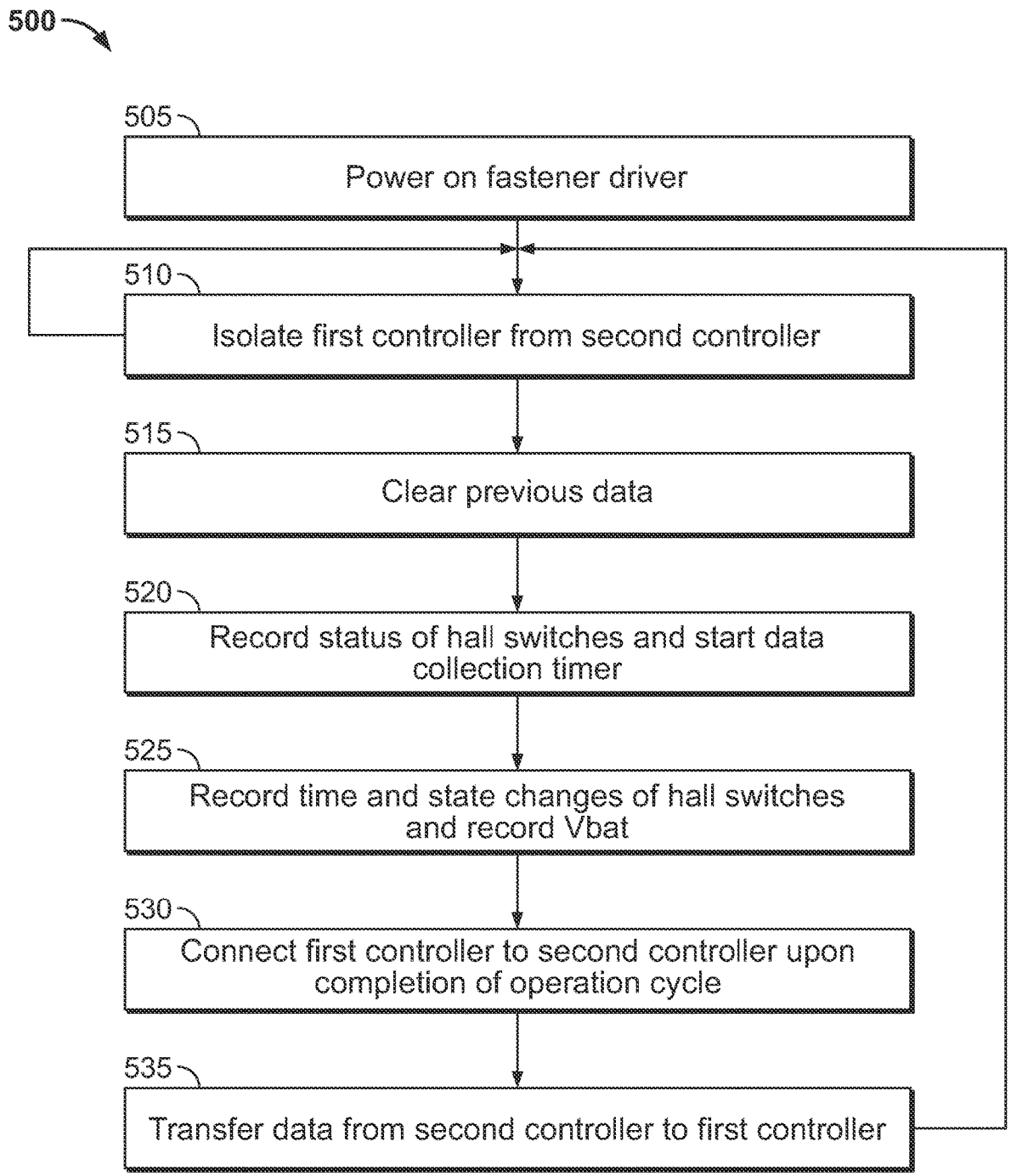
FIG. 13 is a flow chart of a method for collecting data from the motor of a power tool, in accordance with an embodiment of the disclosure.

FIG. 13 is a flowchart illustrating a method 500 for collecting the data indicative of the result of a fastener driving cycle via the second controller 305b, according to some embodiments. It should be understood that the order of the steps disclosed in the method 500 could vary. For example, additional steps may be added to the process and not all of the steps may be required, or steps shown in one order may occur in a second order. The method 500 begins at step 505 when the second controller 305b receives a signal to begin an operation of the power tool (e.g., the power tool is powered on). The method 500 then proceeds to step 510.

At step 510, similar to step 425 of method 400, the first controller 305a is isolated from the second controller 305b via communication line 322. In some embodiments, the communication line 322 is an electrical connection between one or more output units 350b and one or more input units 345a. The first controller 305a generates a signal, in response to the actuation of the trigger 26, to initiate isolation of the first controller 305a from the second controller 305b through the hardware of the first controller 305a. Isolating the first controller 305a from the second controller 305b prevents the communication of data indicative of the status of the fastener driving cycle and may allow each mechanism control scheme to be altered based on the results of the previous operation cycle of the fastener driver. The method 500 then proceeds to step 515. At step 515, the second controller 305b clears any previous data stored in the memory 330b (including, but not limited to data storage 340b) indicative of data collected during previous fastener driving cycles. The method then proceeds to step 520.

At step 520, the second controller 305b receives, via the one or more input units 345b, a plurality of signals from the one or more sensors 85 indicative of the position of the compressor piston 42 during the fastener driving cycle. The plurality of signals is indicative of when each of the one or more sensors 85 are activated by the end-mounted magnet of the piston pin 82 corresponding to the position of the compressor piston 42 throughout the operation cycle. For example, the plurality of signals may include data indicative of when the compressor piston 42 is at the BDC position, when the compressor piston 42 reaches a peak torque position, when the compressor piston 42 reaches the TDC position. When the second controller 305b receives one or more of the plurality of signals, the second controller 305b initiates a data collection control timer corresponding to the timer duration for the complete fastener driving operation (e.g., for the compressor piston 42 to return to the BDC position). The method 500 then proceeds to step 525.

At step 525, the second controller 305b stores the data indicative of the activation of the one or more sensors 85 within memory 330b during the fastener driving cycle. When each of the one or more sensors 85 activate, indicative of when the compressor piston 42 reaches a peak torque position and when the compressor piston 42 reaches the TDC position, the second controller 305b measures a voltage of the battery pack 355 and stores the measured voltage within memory 330b during the fastener driving cycle. The method 500 then proceeds to step 530. At step 530, similar to step 435 of method 400, the first controller 305a terminates the signal indicative of the hardware isolation of the first controller 305a from the second controller 305b via the communication line 322 allowing data communication between the first controller 305a and the second controller 305b. The method 500 then proceeds to step 535.

At step 535, the second controller 305b transmits the data indicative of the activation of the one or more sensors 85, stored in memory 330b, to the first controller 305a via the communication line 322 after the completion of the fastener driving cycle. The method 500 returns to step 510 where the second controller 305b waits for the signal from the first controller 305a to initiate isolation of the first controller 305a from the second controller 305b through the hardware of the first controller 305a. In some embodiments, if the compressor piston 42 does not completely return to the BDC position at the completion of a fastener driving cycle, the first controller 305a may use the data indicative of the position of the compressor piston 42 and the measured battery voltage from the second controller 305b to control the motor 46 to automatically return the compressor piston 42 to the BDC position. In some embodiments, the first controller 305a may apply a PWM signal to the plurality of FETs connected to the motor 46 to drive the crank arm assembly 54 in a direction to return the compressor piston 42 to the BDC position.

Figure 14:
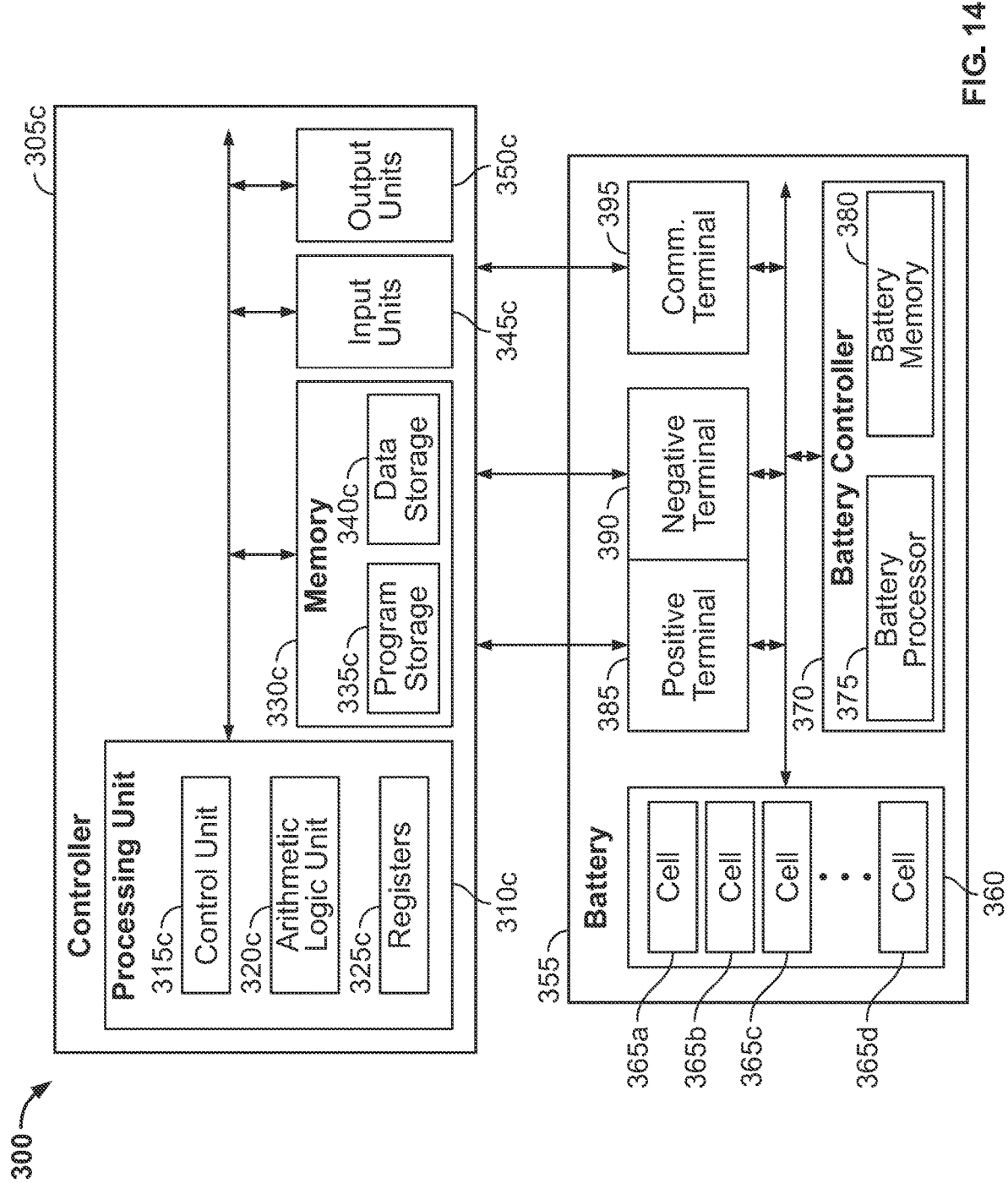
FIG. 14 is a block diagram of a power tool system including a power tool and a battery pack, in accordance with an embodiment of the disclosure.

FIG. 14 is a block diagram of a control system 300 of the powered fastener driver 10, according to some embodiments. In other embodiments, the control system 300 may be used with other power tools. The control system 300 may include a controller 305c, as well as other components not pictured in FIG. 14, for example a motor 46, a solenoid, and/or other mechanical and/or electrical components described above. The controller 305c may include a processing unit 310c comprising a control unit 315c, an arithmetic logic unit 320c, and one or more registers 325c. The controller 305c may further include a memory 330c consisting of program storage 335c and/or data storage 340c. The memory 330c may be flash memory, random access memory, solid state memory, another type of memory, or a combination of these types. The controller 305c may further include one or more input units 345c and/or output units 350c. In some embodiments, the one or more input units 345c may be configured to receive a plurality of inputs such as a shark fin switch signal, a work contact element switch signal, a mode switch signal, a load voltage signal, a trigger signal, signals from one or more sensors 85 or a battery voltage signal. In some embodiments, the one or more output units 350c may be configured to transmit a plurality of outputs such as a battery load test signal, a signal to control a plurality of light-emitting diodes (LEDs), or a signal to control a plurality of FETs connected to the motor 46. For example, the controller 305c may include an IC chip, PID controller, programmable logic controllers, and/or the like. The processing unit 310c may include a microprocessor, a microcontroller, or another suitable programmable device.

The memory 330c is a non-transitory computer readable medium that includes, for example, a program storage area and a data storage area. The program storage area and the data storage area can include combinations of different types of memory, such as read-only memory ("ROM"), random access memory ("RAM") (e.g., dynamic RAM ["DRAM"], synchronous DRAM ["SDRAM"], etc.), electrically erasable programmable read-only memory ("EEPROM"), flash memory, a hard disk, an SD card, or other suitable magnetic, optical, physical, or electronic memory devices. The processing unit 310c is connected to the memory 330c and executes software instructions that are capable of being stored in a RAM of the memory 330c (e.g., during execution), a ROM of the memory 330c (e.g., on a generally permanent basis), or another non-transitory computer readable medium such as another memory or a disc. Software included in the implementation of the fastener driver 10 can be stored in the memory 330c of the controller 305c. The software includes, for example, firmware, one or more applications, program data, filters, rules, one or more program modules, and other executable instructions. The controller 305c is configured to retrieve from memory and execute, among other things, instructions related to the control of the fastener driver 10 described herein. In other constructions, the controller 305c includes additional, fewer, or different components.

The battery pack 355 may include a stack 360 consisting of one or more battery cells 365. In some embodiments, the one or more battery cells 365 (e.g., lithium ion cells or cells having similar chemistry) are electrically connected to each other in a series-type manner. In other embodiments, the one or more battery cells 365 are electrically connected to each other in a parallel-type manner. In still other embodiments, the one or more battery cells 365 are electrically connected to each other in a combination of a series-type and a parallel-type manner. The battery pack 355 may further include a battery pack controller 370 consisting of a battery processor 375 and a battery memory 380. The battery pack 355 may further include a positive battery terminal 385 and a negative battery terminal 390. The positive battery terminal 385 and the negative battery terminal 390 may be configured to electrically and/or mechanically couple to corresponding terminals of the powered fastener driver 10. In some embodiments, the battery pack 355 includes a communication terminal 395, which may be configured to electrically, mechanically, and/or communicatively couple to one or more communication terminals of the powered fastener driver 10.

In some embodiments, such as the block diagram of FIG. 14, the one or more battery cells 365 are connected to the battery pack controller 370. The battery pack controller 370 controls the power delivered to the positive battery terminal 385 and the negative battery terminal 390 (for example, via control of a discharge field-effect transistor (FET), a charge FET, and/or other FETs located within the battery pack). In some embodiments, the battery pack controller 370 controls the power by allowing or prohibiting power. Additionally, in some embodiments, the battery pack controller 370 controls the power by allowing a percentage of power generated by the one or more battery cells 365 to be output. In some embodiments, the amount of power delivered between the battery terminals 385, 390 is approximately 100% of power possibly generated by the one or more battery cells 365.

Figure 15:
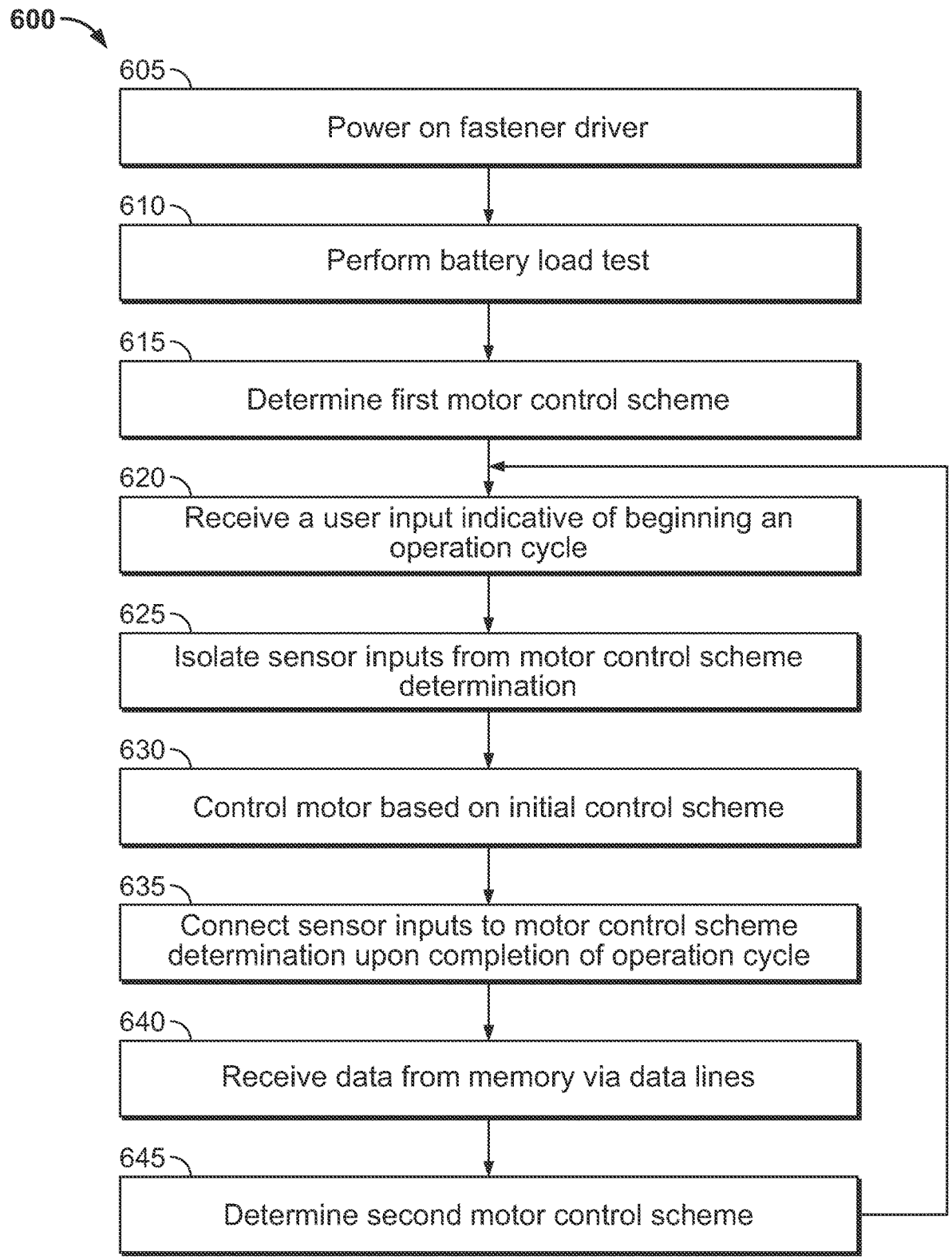
FIG. 15 is a flow chart of a method for controlling the motor of a power tool, in accordance with an embodiment of the disclosure.

FIG. 15 is a flowchart illustrating a method 600 for controlling a motor (e.g., the motor 46) of a power tool (e.g., the powered fastener driver 10), according to some embodiments. It should be understood that the order of the steps disclosed in the method 600 could vary. For example, additional steps may be added to the process and not all of the steps may be required, or steps shown in one order may occur in a second order. The method 600 begins at step 605 when the controller 305c receives a signal to begin an operation of the power tool (e.g., the power tool is powered on). The method 600 then proceeds to step 610.

At step 610, the controller 305c performs a battery load test on the battery pack 355 prior to a fastener driving cycle. The battery load test may further include determining whether the battery pack 355 is electrically, mechanically, and/or communicatively coupled to the power tool when the first controller 305a determines that the battery pack 355 includes a communication terminal 395. If the controller 305c determines that the battery pack 355 does not include a communication terminal 395, the controller 305c performs load testing on the battery pack 355 by measuring a voltage of the battery pack 355 prior to a fastener driving cycle. The method 600 may further include determining, via the controller 305c, an internal resistance of the battery pack. The internal resistance may be determined by measuring a voltage and/or a current of the battery pack 355 prior to a fastener driving cycle. The method 600 may further include determining, via the controller 305c, a type of battery pack based on the determined internal resistance. If the controller 305c determines that the battery pack 355 does include a communication terminal 395, the method 600 includes determining a type of battery pack by receiving a signal from the battery pack communication terminal. The method 600 then proceeds to step 615.

At step 615, the controller 305c determines a first mechanism control scheme. The first mechanism control scheme may include determining a timing of one fastener driving cycle of the motor 46 (coinciding with one fastener driving cycle of the fastener driver 10). The first mechanism control scheme may include electrically controlling the motor 46 to drive the crank arm assembly 54. In some embodiments, the motor 46 drives the crank arm assembly 54 in a first direction. The first mechanism control scheme may further include determining a duty cycle of a PWM signal to apply to the plurality of FETs connected to the motor 46 to drive the crank arm assembly 54. The first mechanism control scheme may further include determining a duty cycle of a PWM signal to apply to the plurality of FETs connected to the motor 46 to electrically brake the crank arm assembly 54. Once the first mechanism control scheme is determined, the method 600 proceeds to step 620.

At step 620, the controller 305c receives a signal from a first user input, via the one or more input units 345c, indicative of the beginning of a fastener driving cycle (e.g., the beginning of an operation cycle). In some embodiments, the signal to begin a fastener driving cycle of the motor 46 may be based on an actuation of the trigger 26 or another switch of the power tool. In some embodiments, the controller 305c may receive a signal from a mode switch (not shown) indicative of a mode of the fastener driver 10 prior to the actuation of the trigger 26. In other embodiments, the power tool may begin the fastener driving cycle in response to an actuation of the trigger 26 in combination with an actuation of a work contact element switch (not shown) and/or actuation of a second trigger (e.g., a sharkfin switch). Actuation of the work contact element switch transmits a signal to the controller 305c indicative of the beginning of a fastener driving operation. The method 600 then proceeds to step 625.

At step 625, sensor inputs received from the one or more sensors 85 are isolated from the determination of subsequent mechanism control schemes via the software of the controller 305c. The controller 305c generates a signal, in response to the actuation of the trigger 26, to initiate isolation of the sensor inputs received from the one or more sensors 85 from the determination of subsequent mechanism control schemes through the software of the controller 305c. For example, during the software isolation, the one or more input units 345c receive a plurality of signals from the one or more sensors 85 during a fastener driving cycle and the plurality of signals from the one or more sensors 85 are stored in the memory 330c. Isolating the plurality of signals from the one or more sensors 85 from the determination of subsequent mechanism control schemes prevents the determination of a second mechanism control scheme, as further described below, during the fastener driving cycle (e.g., during the first mechanism control scheme). In some embodiments, the isolation of the plurality of signals from the one or more sensors 85 from the determination of a second mechanism control scheme actuates a timer of the controller 305c corresponding to the timing of one fastener driving cycle of the motor. The one fastener driving cycle may be the time between when the motor 46 begins driving the crank arm assembly 54 from a starting position (e.g., when the compressor piston 42 is at or near the BDC position) to when the crank arm assembly 54 drives the compressor piston 42 to complete a fastener driving cycle (e.g., when the compressor piston 42 returns to the BDC position). Once the method 600 isolates the controller 305c from the memory 330c, the method 600 proceeds to step 630.

At step 630, the controller 305c controls the motor 46 based on the first control scheme determined in step 615 via the one or more output units 350c. At least one of the one or more output units 350c is electrically connected to the motor 46. Based on the timing of the fastener driving cycle, the controller 305c determines a plurality of time intervals (e.g., a first time, a second time, a third time, a fourth time, etc.). The first mechanism control scheme further includes driving the motor 46 and electrically braking the motor 46 at the plurality of determined time intervals for a plurality of durations corresponding to a duty cycle of a PWM signal. Electrically braking the motor 46 may include electrically shorting the lead wires of the motor 46 together for a determined duration. The method 600 further includes applying a series of voltage pulses to the motor 46. For example, the voltage pulses may correspond to a duty cycle of a PWM signal. For example, in a complete fastener driving cycle, the controller 305c applies a PWM signal to drive the motor 46 at a first time (e.g., a first driving time interval) for a first duration (e.g., a first duty cycle) (i.e., to compress air via the compressor piston 42 and release the drive piston 62), applies a PWM signal to electrically brake the motor 46 at a second time (e.g., a first braking time interval) for a first duration (i.e., to slow or stop the motor 46 and allow residual pressure to vent), applies a PWM signal to drive the motor 46 at a third time (e.g., a second driving time interval) for a third duration (e.g., a second duty cycle) (i.e., to return the compressor piston 42 to the BDC position and create a vacuum to reset the drive piston 62 to the TDC position), and applies a PWM signal to electrically brake the motor 46 at a fourth time (e.g., a second braking time interval) for a second duration (i.e., to stop the compressor piston 42 at or near the BDC position for the subsequent fastener driving cycle). As such, this ensures the compressor piston 42 is returned to the BDC position prior to the subsequent fastener driving cycle.

In some embodiments, the motor 46 drives the crank arm assembly 54 in a first direction in a first fastener driving cycle of the motor 46, wherein one fastener driving cycle is the time between when the motor 46 begins driving the crank arm assembly 54 from a starting position (e.g., when the compressor piston 42 is at or near the BDC position) to when the crank arm assembly 54 drives the compressor piston 42 to reach the TDC position and continues to the near BDC position, completing the fastener driving cycle. The motor 46 may then drive the crank arm assembly 54 in a second direction, opposite the first direction, in a second fastener driving cycle of the motor 46. The motor 46 may alternatively drive the crank arm assembly 54 in this fashion in alternative cycles. For example, in the first, third, fifth, and so-on cycles, the motor 46 may drive the crank arm assembly 54 in a clockwise direction, while in the second, fourth, sixth, and so-on cycles, the motor 46 may drive the crank arm assembly 54 in a counterclockwise direction. The method 600 then proceeds to step 635.

At step 635, the controller 305c determines the completion of a fastener driving cycle based on the completion of the first mechanism control scheme. The completion of the mechanism control scheme is determined by a timer that times the compressor piston 42 returning to the BDC position. In some embodiments, the completion of the fastener driving cycle may correspond to the end of the actuation of the trigger 26 or other switch. In other embodiments, the completion of the fastener driving cycle may correspond to the end of the timer of the controller 305c. Upon completion of the fastener driving cycle, the controller 305c terminates the signal indicative of the software isolation of the sensor inputs received from the one or more sensors 85 from the determination of subsequent mechanism control schemes via the software of the controller 305c allowing the controller 305c to process the plurality of signals from the one or more sensors 85 stored in the memory 330c. The method then proceeds to step 640.

At step 640, the controller 305c receives data indicative of the fastener driving cycle corresponding to the first mechanism control scheme from the memory 330c, as described in greater detail below. The memory 330c transmits the data via electronic communication with the controller 305c only after the completion of the fastener driving cycle. The method 600 then proceeds to step 645. At step 645, the controller 305c determines the second mechanism control scheme based on the data received from the memory 330c. In some embodiments, the first mechanism control scheme is adjusted based on the data received indicative of the fastener driving cycle to determine the second control scheme. Upon the determination of the second control scheme, the method 600 returns to step 620 where the controller 305c waits for a signal indicative of the beginning of a second fastener driving cycle. In some embodiments, the fastener driver 10 may wait to begin the second fastener driving cycle until a second actuation of the trigger 26 or other switch occurs.

Figure 16:
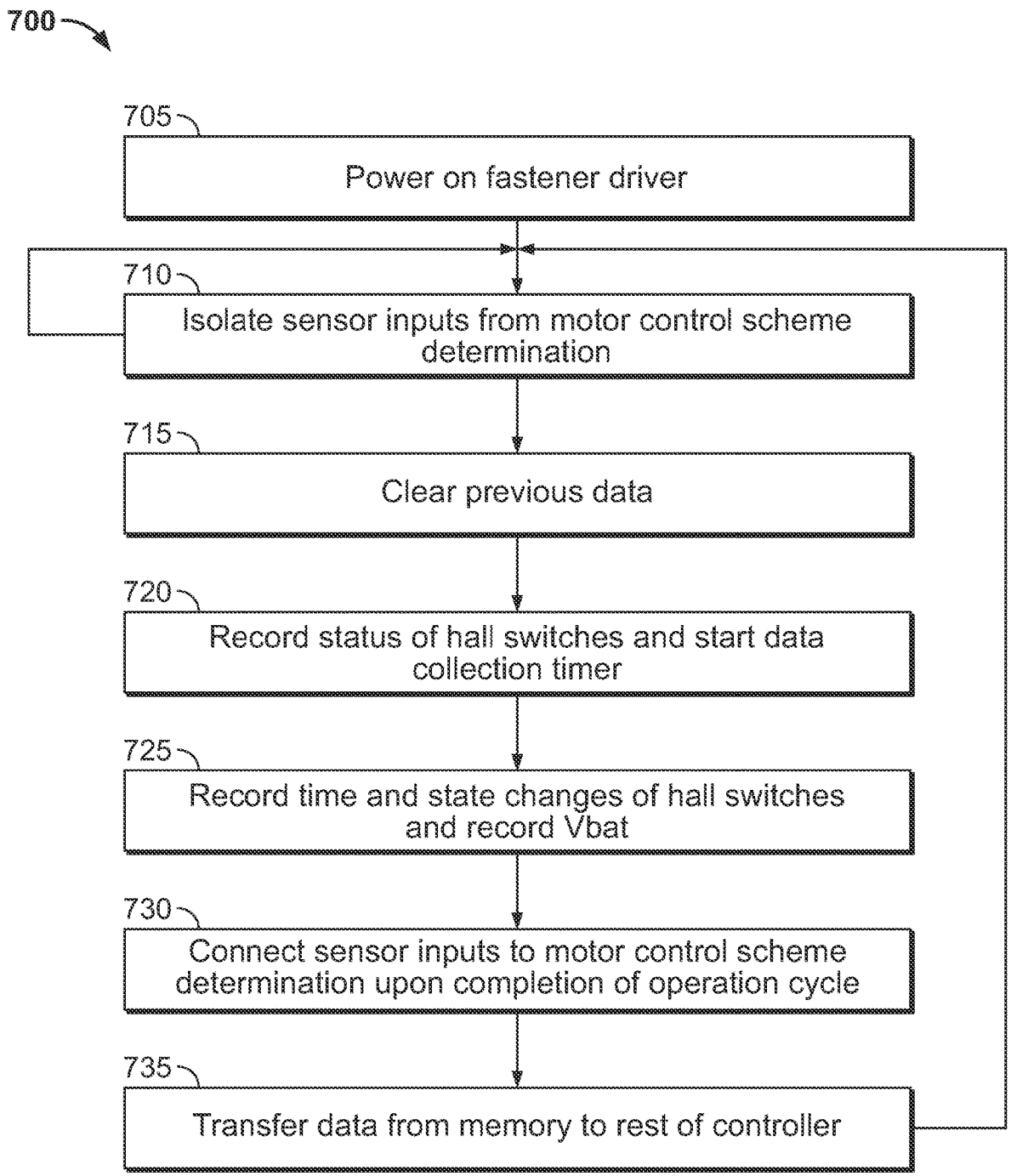
FIG. 16 is a flow chart of a method for collecting data from the motor of a power tool, in accordance with an embodiment of the disclosure.

FIG. 16 is a flowchart illustrating a method 700 for collecting the data indicative of the result of a fastener driving cycle via the memory 330c, according to some embodiments. It should be understood that the order of the steps disclosed in the method 700 could vary. For example, additional steps may be added to the process and not all of the steps may be required, or steps shown in one order may occur in a second order. The method 700 begins at step 705 when the memory 330c receives a signal to begin an operation of the power tool (e.g., the power tool is powered on). The method 700 then proceeds to step 710.

At step 710, similar to step 625 of method 600, the sensor inputs received from the one or more sensors 85 are isolated from the determination of subsequent mechanism control schemes via software isolation. For example, the software isolation may prevent the determination of a second mechanism control scheme during a fastener driving cycle. The controller 305c generates a signal, in response to the actuation of the trigger 26, to initiate isolation of the plurality of signals from the one or more sensors 85 from the determination of subsequent mechanism control schemes through the software of the controller 305c. Isolating the plurality of signals from the one or more sensors 85 from the determination of subsequent mechanism control schemes prevents the processing of data indicative of the status of the fastener driving cycle. The method 700 then proceeds to step 715. At step 715, the memory 330c clears any previous data stored indicative of data collected during previous fastener driving cycles. The method then proceeds to step 720.

At step 720, the memory 330c receives, via the one or more input units 345c, a plurality of signals from the one or more sensors 85 indicative of the position of the compressor piston 42 during the fastener driving cycle. The plurality of signals is indicative of when each of the one or more sensors 85 are activated by the end-mounted magnet of the piston pin 82 corresponding to the position of the compressor piston 42 throughout the operation cycle. For example, the plurality of signals may include data indicative of when the compressor piston 42 is at the BDC position, when the compressor piston 42 reaches a peak torque position, when the compressor piston 42 reaches the TDC position. When the memory 330c receives one or more of the plurality of signals, the memory 330c initiates a data collection control timer corresponding to the timer duration for the complete fastener driving operation (e.g., for the compressor piston 42 to return to the BDC position). The method 700 then proceeds to step 725.

At step 725, the memory 330c stores the data indicative of the activation of the one or more sensors 85 during the fastener driving cycle. When each of the one or more sensors 85 close, indicative of when the compressor piston 42 reaches a peak torque position and when the compressor piston 42 reaches the TDC position, the memory 330c measures a voltage of the battery pack 355 and stores the measured voltage during the fastener driving cycle. The method 700 then proceeds to step 730. At step 730, similar to step 635 of method 600, the controller 305c terminates the signal indicative of the software isolation of the plurality of signals from the one or more sensors 85 from the determination of subsequent mechanism control schemes via the software of the controller 305c allowing the controller 305c to process the plurality of signals from the one or more sensors 85 stored in the memory 330c. The method 700 then proceeds to step 735.

At step 735, the memory 330c transmits the data indicative of the activation of the one or more sensors 85 to the controller 305c only after the completion of the fastener driving cycle. The method 700 returns to step 710 where the memory 330c waits for the signal from the controller 305c to initiate isolation of the plurality of signals from the one or more sensors the determination of subsequent mechanism control schemes through the software of the controller 305c. In some embodiments, if the compressor piston 42 does not completely return to the BDC position at the completion of a fastener driving cycle, the controller 305c may use the data indicative of the position of the compressor piston 42 and the measured battery voltage from the memory 330c to control the motor 46 to automatically return the compressor piston 42 to the BDC position. In some embodiments, the controller 305c may automatically apply a PWM signal to the plurality of FETs connected to the motor 46 to drive the crank arm assembly 54 in a direction to return the compressor piston 42 to the BDC position. In other embodiments, the controller 305c may apply a PWM signal to the plurality of FETs connected to the motor 46 to drive the crank arm assembly 54 in a direction to return the compressor piston 42 to the BDC position following the completion of the fastener driving cycle.

Although the present subject matter has been described in detail with reference to certain preferred embodiments, variations and modifications exist within the scope of one or more independent aspects of the present subject matter as described.

What is claimed is:

1. A method of controlling a motor of a power tool, the method comprising:
    performing, via a first controller, a load test on a battery pack of the power tool;
    determining, via the first controller, a first mechanism control scheme based on the load test;
    receiving, via the first controller, an input indicative of beginning an operation cycle of the power tool;
    isolating the first controller from a second controller;
    controlling, via the first controller, the motor of the power tool based on the first mechanism control scheme while the first controller is isolated from the second controller;
    sensing, via one or more sensors, a dataset indicative of a result of the operation cycle of the power tool based on the first mechanism control scheme;
    receiving, via the second controller, the dataset;
    connecting the first controller and the second controller upon completion of the operation cycle;

transmitting, via the second controller, the dataset to the first controller upon completion of the operation cycle; and determining, via the first controller, a second mechanism control scheme based on the dataset.

2. The method of claim 1, further comprising:
receiving, via the first controller, a second user input indicative of beginning a second operation cycle of the power tool;
controlling, via the first controller, the motor of the power tool based on the second mechanism control scheme while the first controller is isolated from the second controller.

3. The method of claim 1, wherein the first mechanism control scheme includes applying a pulse-width modulated (PWM) signal to control the motor.

4. The method of claim 1, wherein the first mechanism control scheme includes applying a braking signal to control the motor.

5. The method of claim 1, wherein the one or more sensors are Hall effect sensors.

6. The method of claim 5, wherein the method further comprises:
sensing, via the one or more sensors, a position of a first piston of the power tool.

7. The method of claim 1, wherein the isolating the first controller from the second controller prevents data communication while the motor is powered via an external circuit.

8. The method of claim 1, wherein the second mechanism control scheme is implemented for a second operation cycle of the power tool.

9. A non-transitory computer-readable medium storing a program for controlling the motor of the power tool including instructions that, when executed by a processor, causes the first controller connected to the processor, to be configured to implement the method of claim 1.

10. A method of controlling a motor of a power tool, the method comprising:
electrically braking the motor, via a command from a first controller, based on a first mechanism control scheme;
detecting, via the first controller, a completion of an operation cycle of the motor;
transmitting, via a second controller, a dataset indicative of a position of a first piston of the power tool to the first controller upon completion of the operation cycle; and
determining, via the first controller, a second mechanism control scheme based on the dataset,
wherein the first controller is isolated from the second controller during the operation cycle.

11. The method of claim 10, wherein electrically braking the motor includes dynamically braking with a plurality of motor control field effect transistors (FETs).

12. The method of claim 10, wherein the second mechanism control scheme is implemented for a second operation cycle of the power tool.

13. The method of claim 10, wherein the first mechanism control scheme is based on a load test of a battery pack of the power tool.

14. The method of claim 10, wherein the operation cycle comprises:
driving the motor for a first driving time interval;
dynamically braking the motor for a first braking time interval;
driving the motor for a second driving time interval, wherein the second driving time interval is different from the first driving time interval;
dynamically braking the motor for a second braking time interval,
wherein the second braking time interval is different from the first braking time interval.

15. A non-transitory computer-readable medium storing a program for controlling the motor of the power tool including instructions that, when executed by a processor, causes the first controller connected to the processor, to be configured to implement the method of claim 10.

16. A powered fastener driver comprising:
a first cylinder;
a first piston positioned within the first cylinder, the first piston being moveable between a top-dead-center (TDC) position and a near bottom-dead-center (BDC) position;
a second cylinder in fluid communication with the first cylinder;
a second piston positioned within the second cylinder, the second piston being moveable between a TDC position and a BDC position to initiate a fastener driving cycle; and
a control system including a first controller configured to:
electrically brake a motor based on a first mechanism control scheme;
drive the motor based on the first mechanism control scheme;
detect a completion of an operation cycle of the motor;
receive, from a second controller, a dataset indicative of a position of the first piston of the power tool completion of the operation cycle; and
determine a second mechanism control scheme based on the dataset,
wherein the first controller is isolated from the second controller during the operation cycle.

17. The powered fastener driver of claim 16, wherein the control system is further configured to:
receive a second user input indicative of beginning a second operation cycle of the power tool; and
control the motor of the power tool based on the second mechanism control scheme while the first controller is isolated from the second controller.

18. The powered fastener driver of claim 16, wherein braking the motor includes dynamically braking with a plurality of motor control field effect transistors (FETs).

19. The powered fastener driver of claim 16, wherein the second mechanism control scheme is implemented for a second operation cycle of the power tool.

20. The powered fastener driver of claim 16, wherein the first mechanism control scheme is based on a load test of a battery pack of the power tool.

21. The powered fastener driver of claim 16, wherein the power fastener driver further includes one or more sensors configured to sense signals to generate the dataset.

22. The power fastener driver of claim 21, wherein the one or more sensors are Hall effect sensors.

23. A method of controlling a motor of a power tool, the method comprising:
performing, via a controller, a load test on a battery pack of the power tool;
determining, via the controller, a first mechanism control scheme based on the load test;
receiving, via the controller, an input indicative of beginning an operation cycle of the power tool;
isolating sensor inputs via one or more sensors from a determination of subsequent mechanism control schemes via the controller;

controlling, via the controller, the motor of the power tool based on the first mechanism control scheme while sensor inputs via one or more sensors are isolated from a determination of subsequent mechanism control schemes;

sensing, via the one or more sensors, a dataset indicative of a result of the operation cycle of the power tool based on the first mechanism control scheme;

receiving, via a memory of the controller, the sensor inputs including the dataset;

connecting the sensor inputs and the determination of subsequent mechanism control schemes via the controller upon completion of the operation cycle;

transmitting, via the memory, the dataset to the controller upon completion of the operation cycle; and determining, via the controller, a second mechanism control scheme based on the dataset.

24. The method of claim 23, further comprising:
receiving, via the controller, a second user input indicative of beginning a second operation cycle of the power tool;

controlling, via the controller, the motor of the power tool based on the second mechanism control scheme while sensor inputs via one or more sensors are isolated from a determination of subsequent mechanism control schemes.

25. The method of claim 23, wherein the first mechanism control scheme includes applying a pulse-width modulated (PWM) signal to control the motor.

26. The method of claim 23, wherein the first mechanism control scheme includes applying a braking signal to control the motor.

27. The method of claim 23, wherein the one or more sensors are Hall effect sensors.

28. The method of claim 27, wherein the method further comprises:
sensing, via the one or more sensors, a position of a first piston of the power tool.

29. The method of claim 23, wherein isolating sensor inputs via one or more sensors from the determination of subsequent mechanism control schemes via the controller prevents processing the dataset via the controller while the motor is powered via an external circuit.

30. The method of claim 23, wherein the second mechanism control scheme is implemented for a second operation cycle of the power tool.

31. A powered fastener driver comprising:
a first cylinder;
a first piston positioned within the first cylinder, the first piston being moveable between a top-dead-center (TDC) position and a near bottom-dead-center (BDC) position;
a second cylinder in fluid communication with the first cylinder;
a second piston positioned within the second cylinder, the second piston being moveable between a TDC position and a BDC position to initiate a fastener driving cycle; and
a control system including a controller configured to:
electrically brake a motor based on a first mechanism control scheme;
drive the motor based on the first mechanism control scheme;
detect a completion of an operation cycle of the motor;
receive, from a memory of the controller, sensor inputs including a dataset indicative of a position of the first piston of the power tool completion of the operation cycle; and
determine a second mechanism control scheme based on the dataset,
wherein the sensor inputs via one or more sensors are isolated from a determination of subsequent mechanism control schemes, via the controller, during the operation cycle.

32. The powered fastener driver of claim 31, wherein the control system is further configured to:
receive a second user input indicative of beginning a second operation cycle of the power tool; and
control the motor of the power tool based on the second mechanism control scheme while the sensor inputs via one or more sensors are isolated from a determination of subsequent mechanism control schemes.

33. The powered fastener driver of claim 31, wherein braking the motor includes dynamically braking with a plurality of motor control field effect transistors (FETs).

34. The powered fastener driver of claim 31, wherein the second mechanism control scheme is implemented for a second operation cycle of the power tool.

35. The powered fastener driver of claim 31, wherein the first mechanism control scheme is based on a load test of a battery pack of the power tool.

36. The power fastener driver of claim 31, wherein the one or more sensors are Hall effect sensors.

* * * * *